United States Patent [19]
Jardine et al.

[11] Patent Number: 6,009,506
[45] Date of Patent: Dec. 28, 1999

[54] COMPUTER ARCHITECTURE CAPABLE OF CONCURRENT ISSUANCE AND EXECUTION OF GENERAL PURPOSE MULTIPLE INSTRUCTIONS

[75] Inventors: Robert L. Jardine, Cupertino; Shannon J. Lynch, Los Altos; Philip R. Manela, Redwood City; Robert W. Horst, Saratoga, all of Calif.

[73] Assignee: Tandem Computers Incorporated, Cupertino, Calif.

[21] Appl. No.: 09/059,271

[22] Filed: Apr. 10, 1998

Related U.S. Application Data

[62] Division of application No. 08/959,643, Oct. 28, 1997, which is a continuation of application No. 08/710,620, Sep. 20, 1996, Pat. No. 5,752,064, which is a continuation of application No. 08/483,661, Jun. 7, 1995, Pat. No. 5,628,024, which is a division of application No. 08/300,815, Sep. 2, 1994, Pat. No. 5,574,941, which is a continuation of application No. 07/890,299, May 27, 1992, Pat. No. 5,390,355, which is a continuation of application No. 07/356,170, May 24, 1989, abandoned.

[51] Int. Cl.$^6$ ................................................ G06F 9/38
[52] U.S. Cl. ............................................. 712/23; 712/216
[58] Field of Search ............................. 712/23, 216, 217, 712/239

[56] References Cited

U.S. PATENT DOCUMENTS

| | | | |
|---|---|---|---|
| 3,881,173 | 4/1975 | Larsen et al. .................... | 340/172.5 |
| 4,295,193 | 10/1981 | Pomerene ....................... | 364/200 |
| 4,476,525 | 10/1984 | Ishii ............................... | 364/200 |
| 4,594,655 | 6/1986 | Hao et al. ....................... | 364/200 |
| 4,594,659 | 6/1986 | Guenther et al. ............... | 364/200 |
| 4,626,989 | 12/1986 | Torii ............................... | 395/375 |
| 4,739,470 | 4/1988 | Wada et al. ..................... | 395/375 |
| 4,760,520 | 7/1988 | Shintani et al. ................. | 364/200 |
| 4,791,557 | 12/1988 | Angel et al. .................... | 364/200 |
| 4,794,517 | 12/1988 | Jones et al. ..................... | 364/200 |
| 4,858,105 | 8/1989 | Kuriyama et al. .............. | 395/375 |
| 4,875,160 | 10/1989 | Brown, III ...................... | 364/200 |
| 4,879,646 | 11/1989 | Iwasaki et al. .................. | 364/200 |
| 4,926,323 | 5/1990 | Baror et al. ..................... | 364/200 |
| 4,945,511 | 7/1990 | Itomitsu et al. ................. | 364/900 |
| 4,991,080 | 2/1991 | Emma et al. .................... | 364/200 |
| 4,991,090 | 2/1991 | Emma et al. .................... | 364/200 |
| 4,992,938 | 2/1991 | Cocke et al. .................... | 364/200 |
| 5,072,364 | 12/1991 | Jardine et al. .................. | 395/375 |
| 5,101,341 | 3/1992 | Circello et al. ................. | 395/375 |
| 5,179,680 | 1/1993 | Colwell et al. ................. | 395/425 |
| 5,390,355 | 2/1995 | Horst .............................. | 395/800 |
| 5,655,098 | 8/1997 | Witt ................................ | 395/386 |

FOREIGN PATENT DOCUMENTS

| | | | |
|---|---|---|---|
| 0 071 028 | 9/1983 | European Pat. Off. | G06F 9/38 |
| 0 118 830 | 9/1984 | European Pat. Off. | G06F 9/38 |
| 0 239 081 | 9/1987 | European Pat. Off. | G06F 9/38 |
| 0 354 740 | 2/1990 | European Pat. Off. | G06F 9/38 |
| 63-283679 | 11/1988 | Japan . | |

OTHER PUBLICATIONS

*IBM Technical Disclosure Bulletin*, vol. 29, No. 1, Jun. 1986, New York, N.Y., pp. 357–359, "Brance Processing Instruction Cache".

*IEEE Transactions on Computers*, vol. 37, No. 5 May 1998, New York, N.Y., pp. 562–573, J.E. Smith, A.R. Pleskun, "Implementing Precise Interrupts in Pipelined Processors".

*IBM Technical Disclosure Bulletin*, vol. 29, No. 2, Jul. 1986, pp. 605–608, "Data Bypass Methodology for a Performance Pipeline Processor".

(List continued on next page.)

*Primary Examiner*—Eric Coleman
*Attorney, Agent, or Firm*—Townsend and Townsend and Crew LLP

[57] ABSTRACT

A system for issuing a family of instructions during a single clock includes a decoder for decoding the family of instructions and logic, responsive to the decode result, for determining whether resource conflicts would occur if the family were issued during one clock. If no resource conflicts occur, an execution unit executes the family regardless of whether dependencies among the instructions in the family exist.

1 Claim, 22 Drawing Sheets

OTHER PUBLICATIONS

Acosta et al., "An Instruction Issuing Approach to Enhancing Performance in Multiple Functional Unit Processors," *IEEE Transactions on Computers*, vol. C–35, No. 9, Sep. 1986, pp. 815–828.

Weis et al., "Instruction Issue Logic in Pipelined Computers," *IEEE Transactions on Computers*, Nov. 1984, pp. 1013–1022.

Pleszkun et al., "The Performance Potential of Multiple Functional Unit Processors," Computer Architecture Conference Proceedings, IEEE, May 1988, pp. 37–44.

Tjaden et al., "Detection and Parallel Execution of Independent Instructions," *IEEE Transactions on Computers*, vol. C–19, No. 10, Oct. 1970, pp. 889–895.

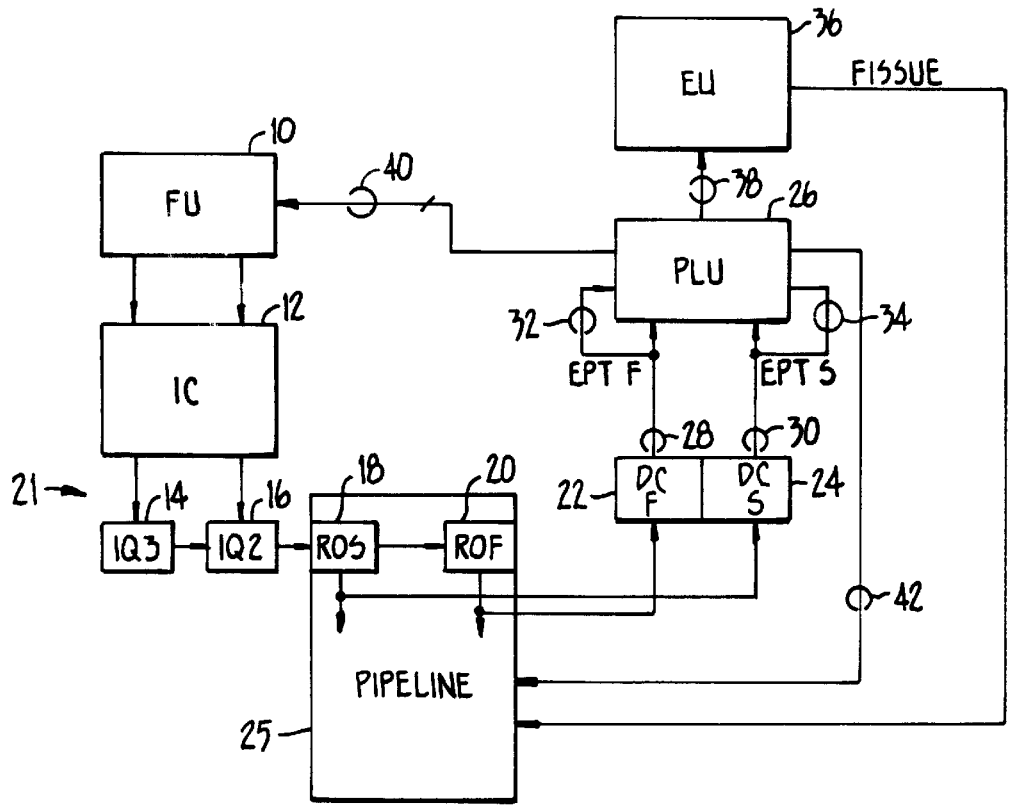
FIG._1.
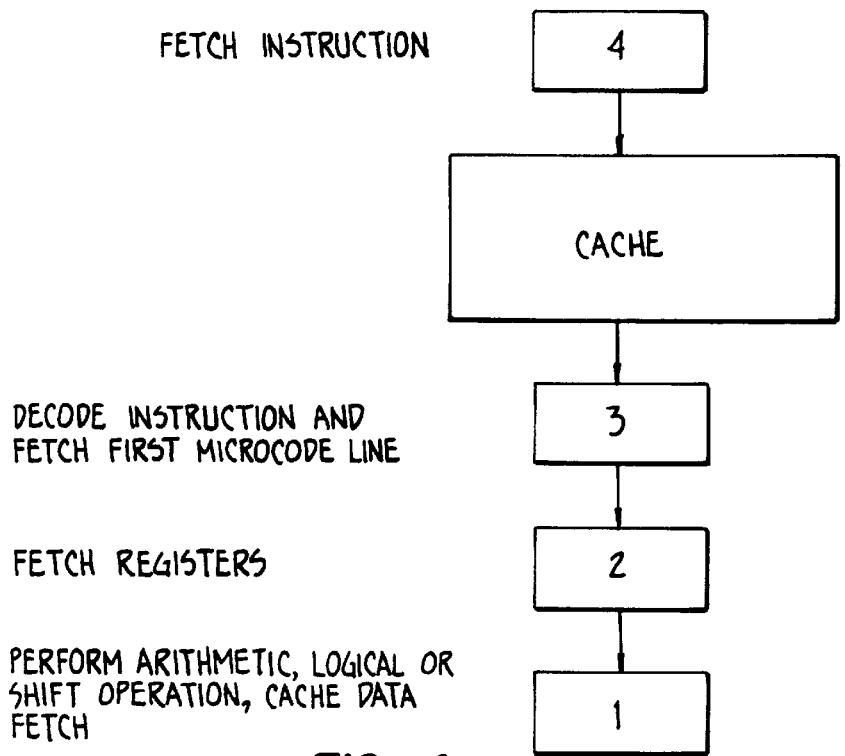
FIG._4.

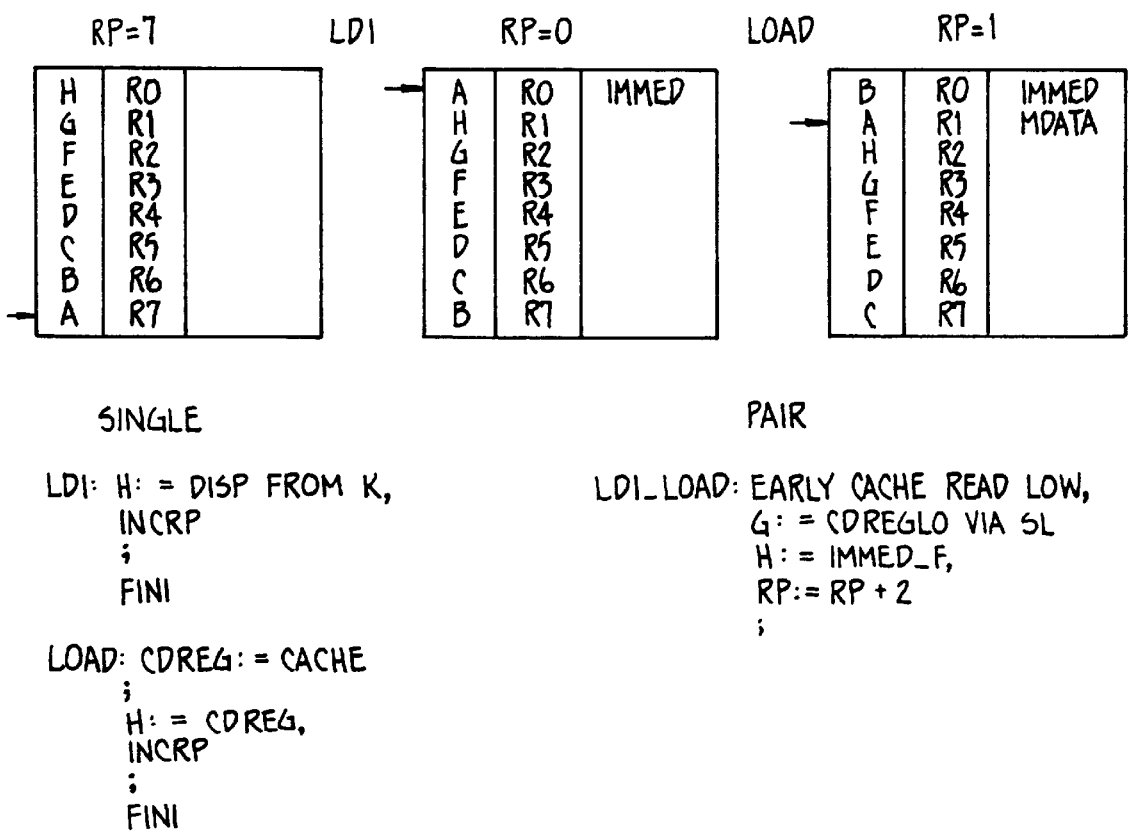
FIG._2.

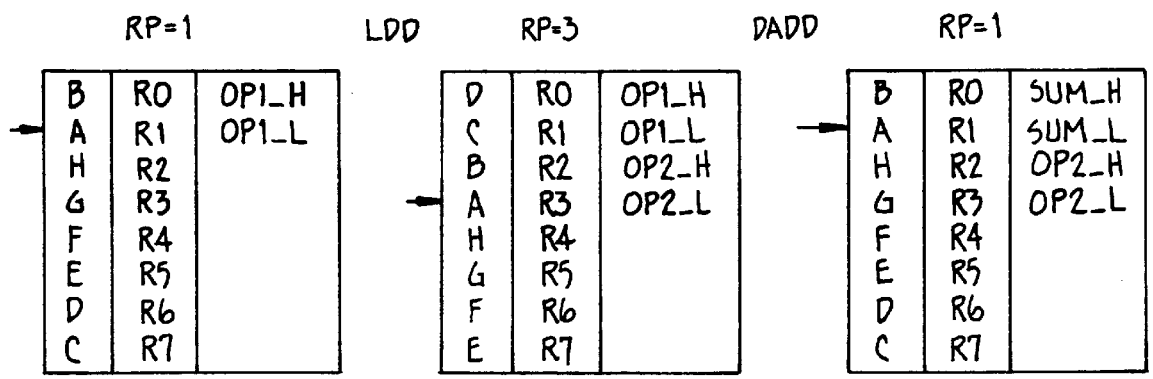
LDD_DADD INSTRUCTION PAIR EXAMPLE
LDD: CDREG := CACHE,
    INCRP → R2
    ;
    A := CDREG,
    CDREG := CACHE
    ;
    H := CDREG,
    INCRP → R3
    ;
    FINI
DADD: C := C + A, LOAD CYF,
    ;
    D := D + B + CYF,
    DEC RP BY 2
    ;
    FINI
LDD_DADD: EARLY CACHE READ 32,
    BA := CDREG32 + BA,
    HG := CDREG32 VIA S32
    ;
FIG._3.

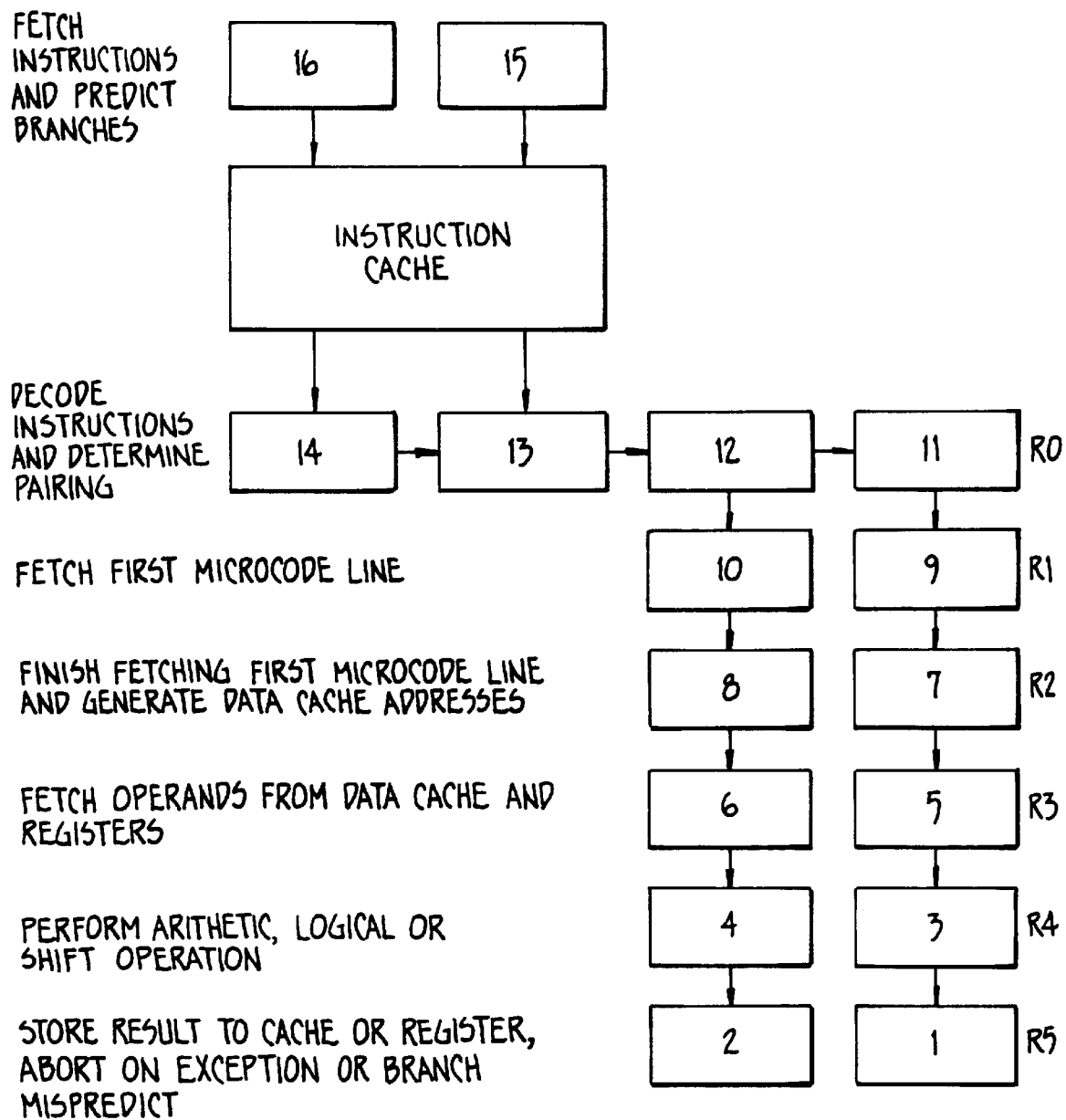
FIG._5.

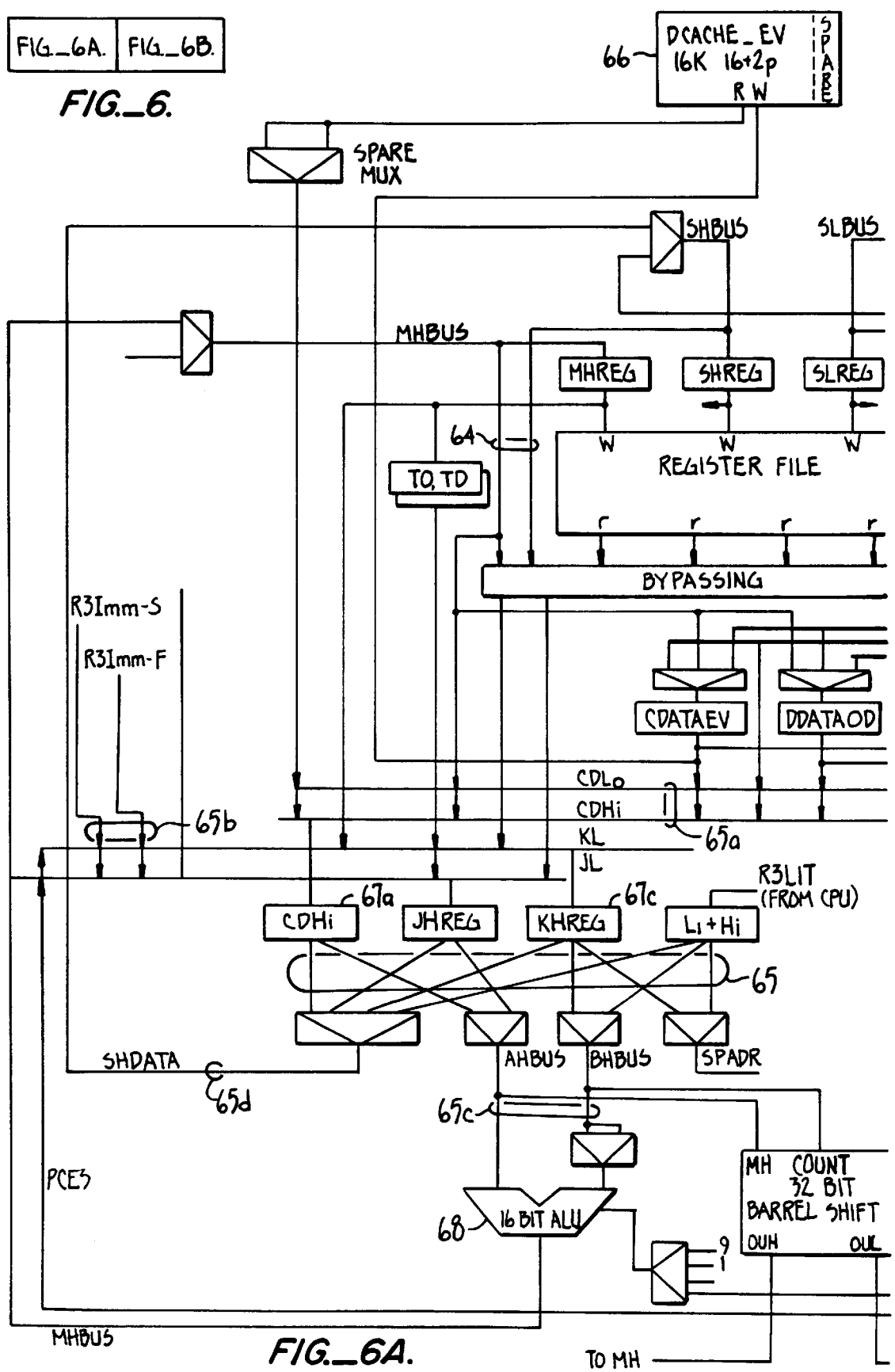

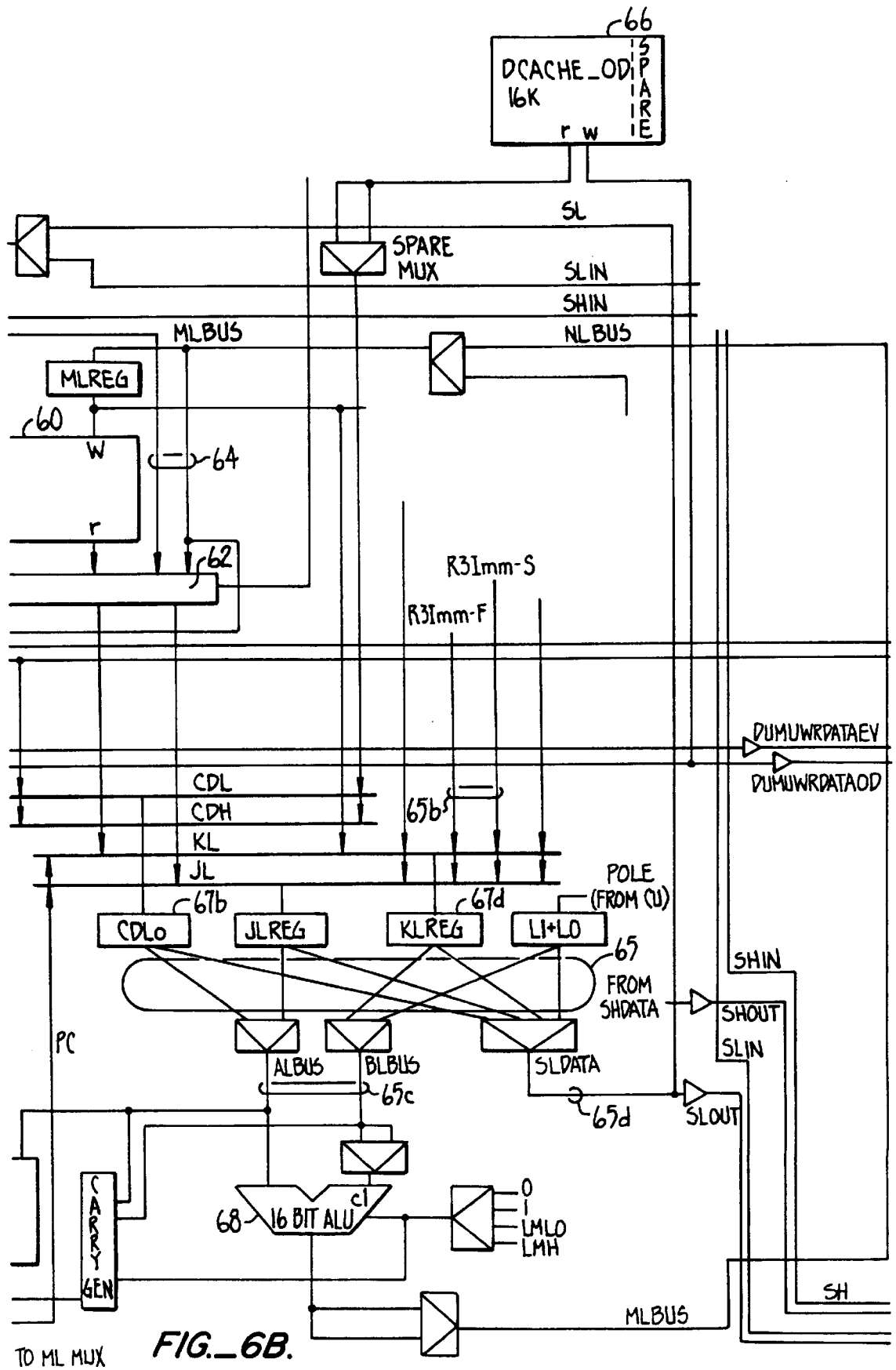
FIG._6B.

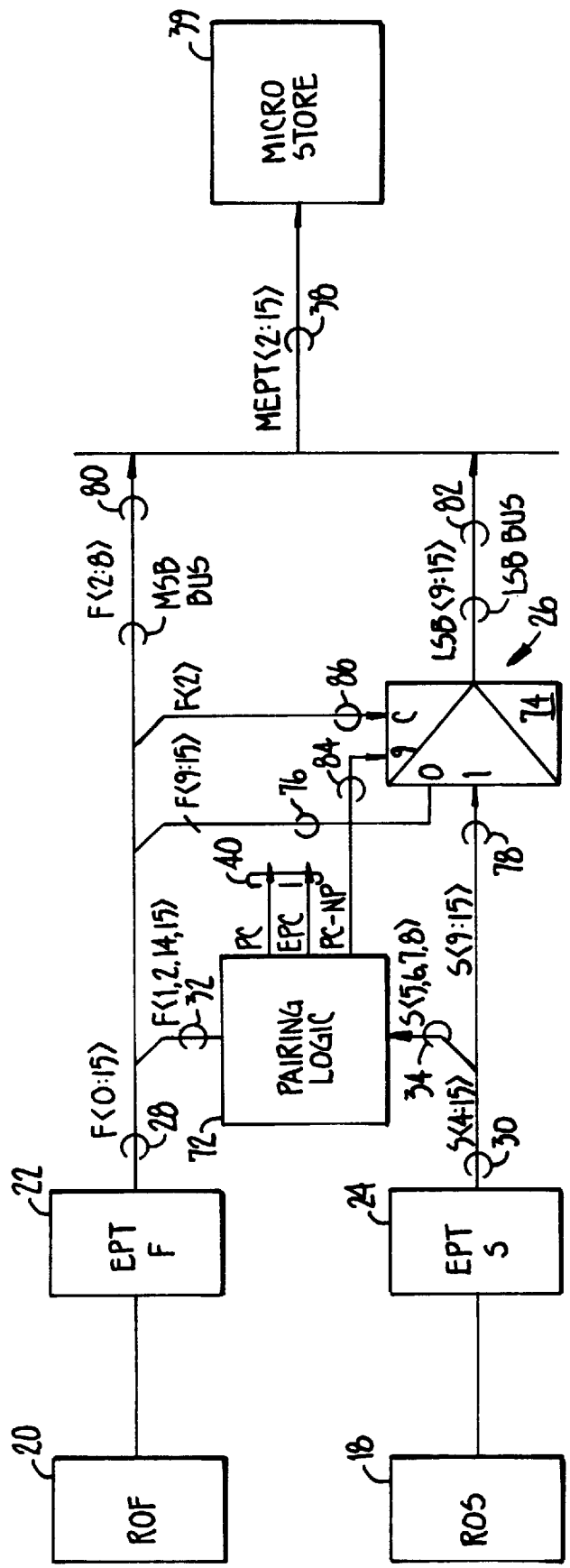
FIG._7.

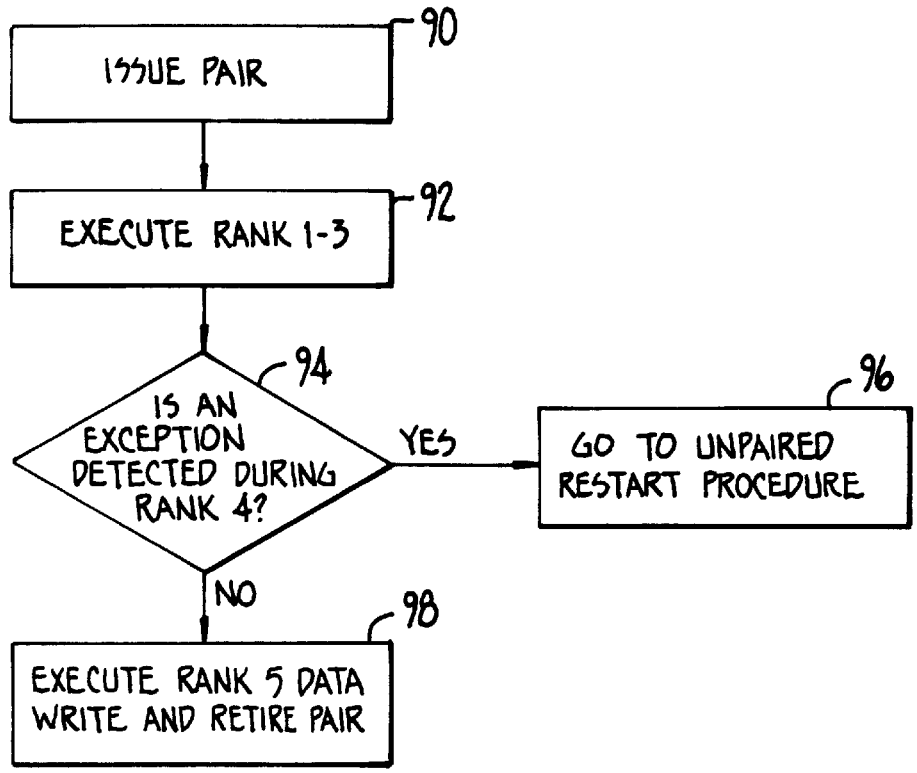
FIG._9.
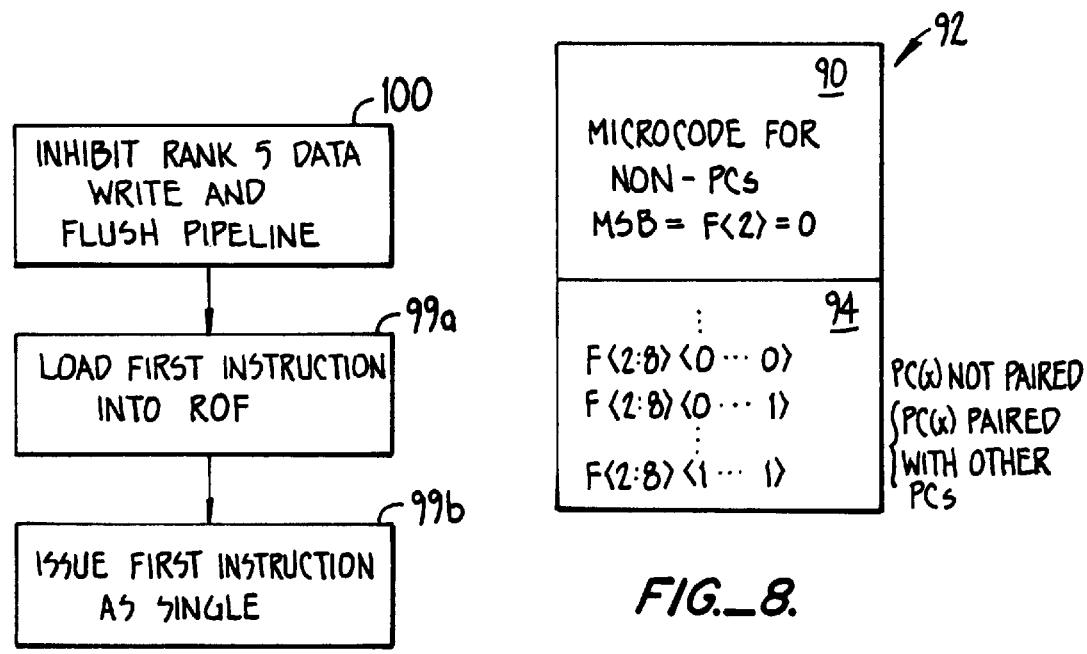
FIG._10.
FIG._8.

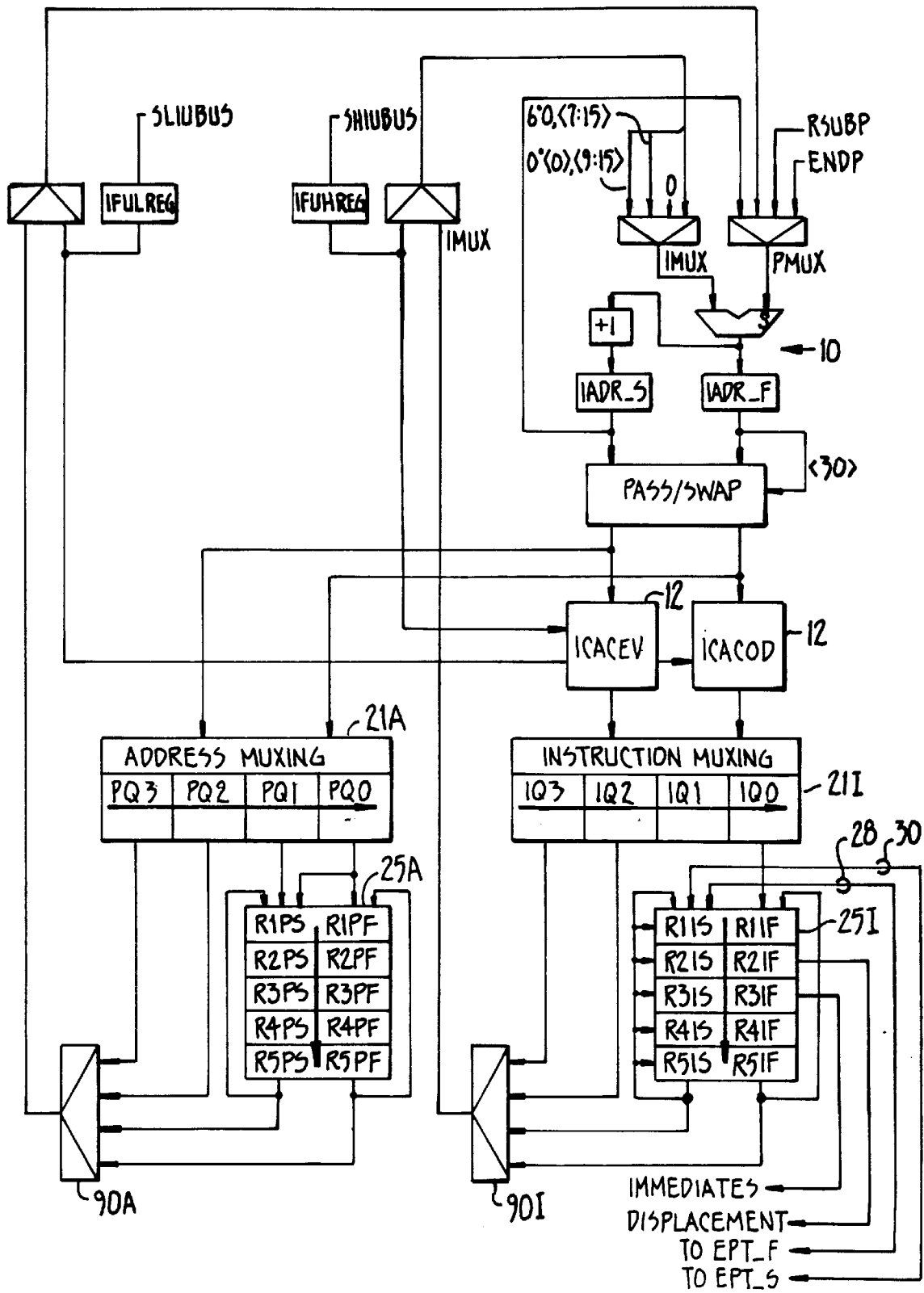
INSTRUCTION CACHE, QUEUE, AND PIPELINE
FIG._11A.

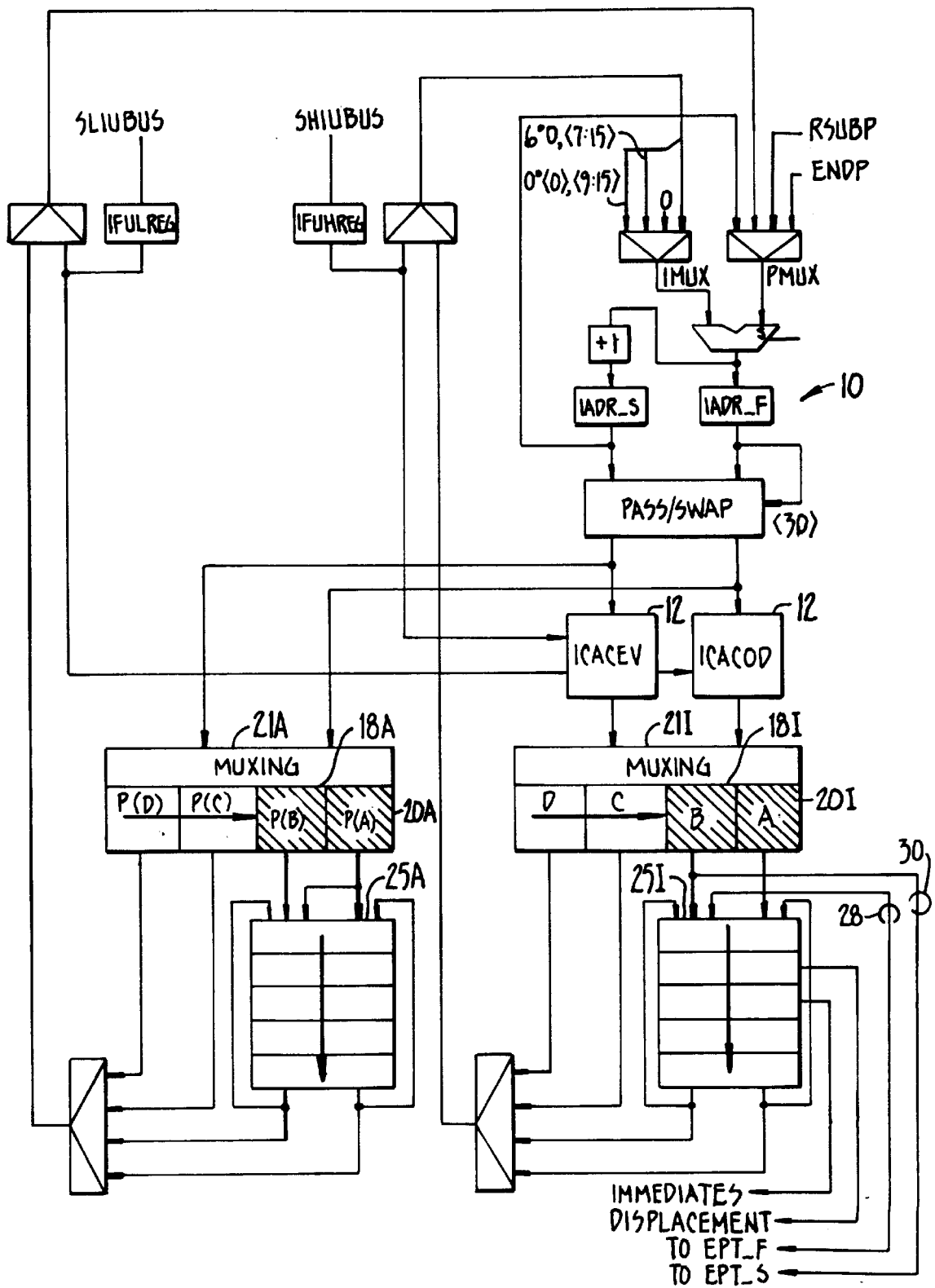
INSTRUCTION PAIR A+B READY TO ISSUE
FIG._11B.

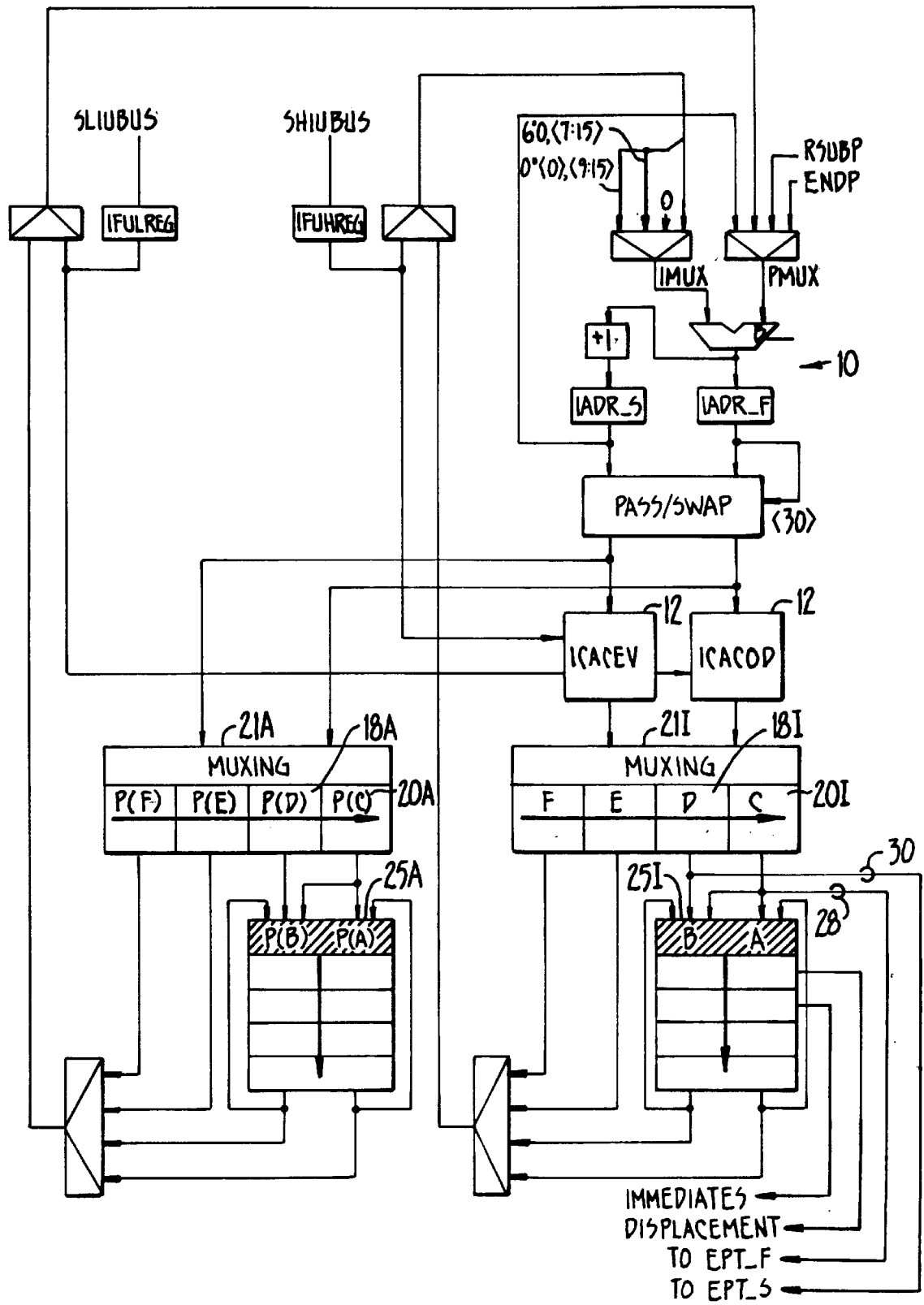
INSTRUCTION PAIR A+B JUST ISSUED
FIG._11C.

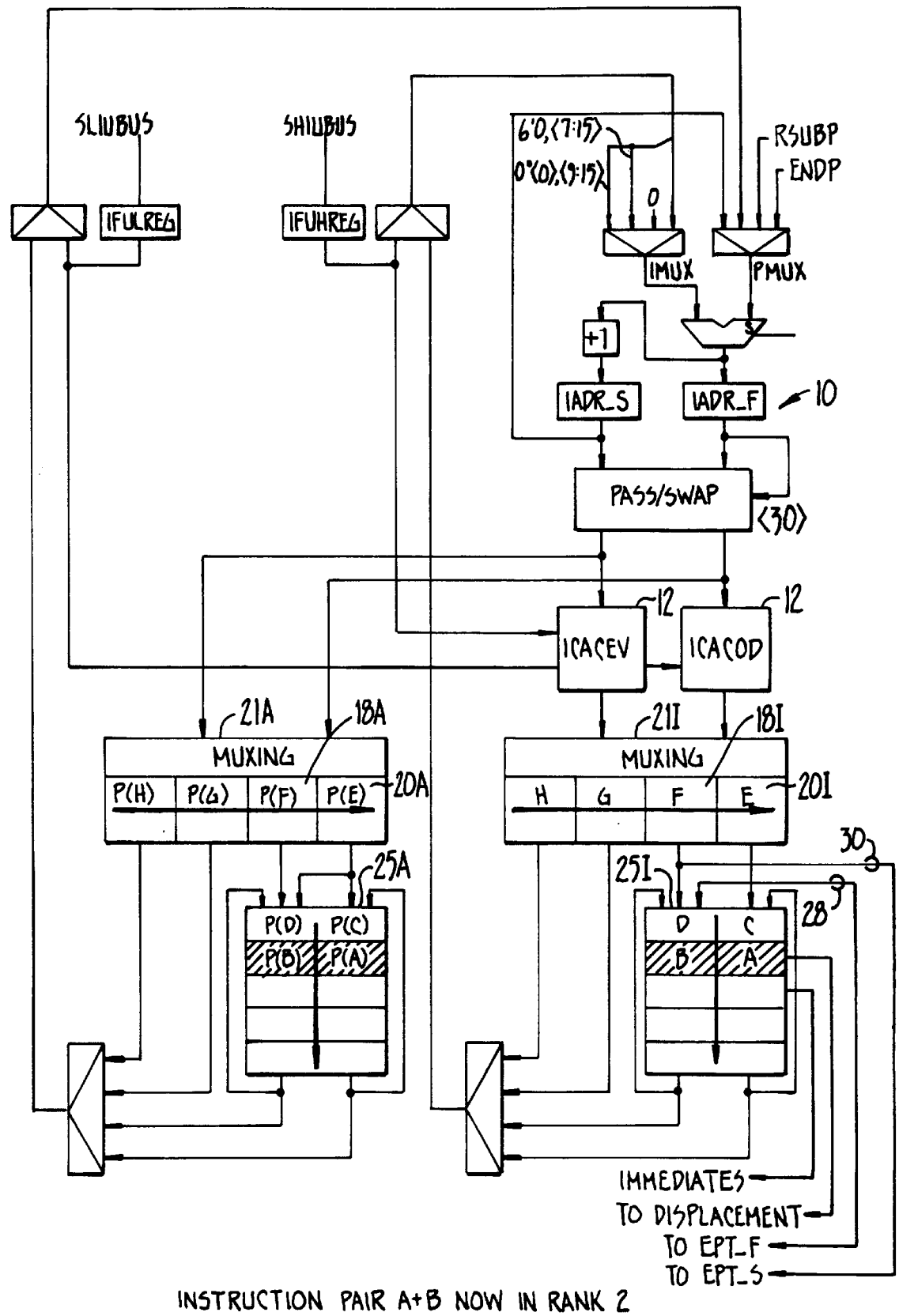
INSTRUCTION PAIR A+B NOW IN RANK 2
FIG._11D.

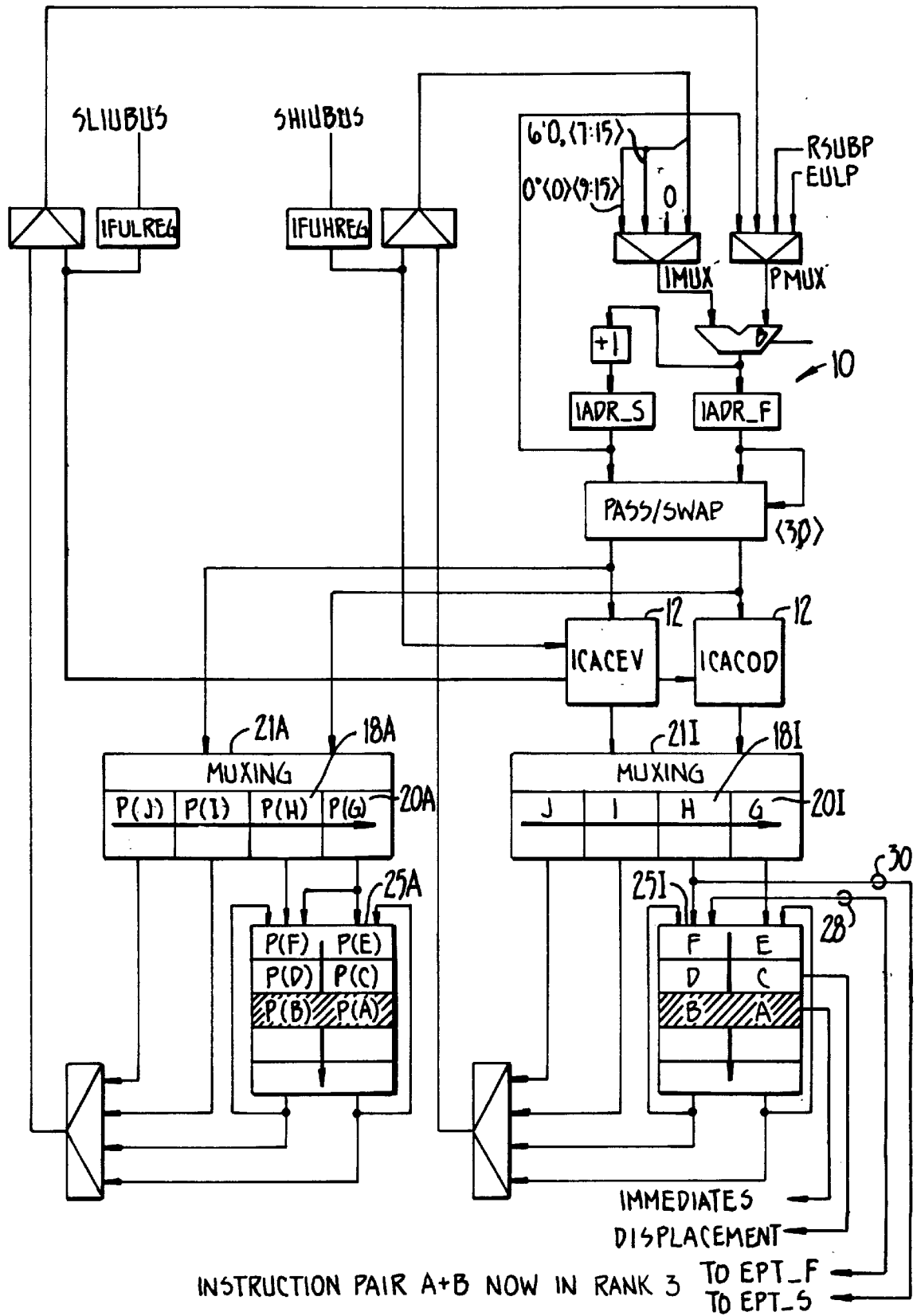
FIG._11E.

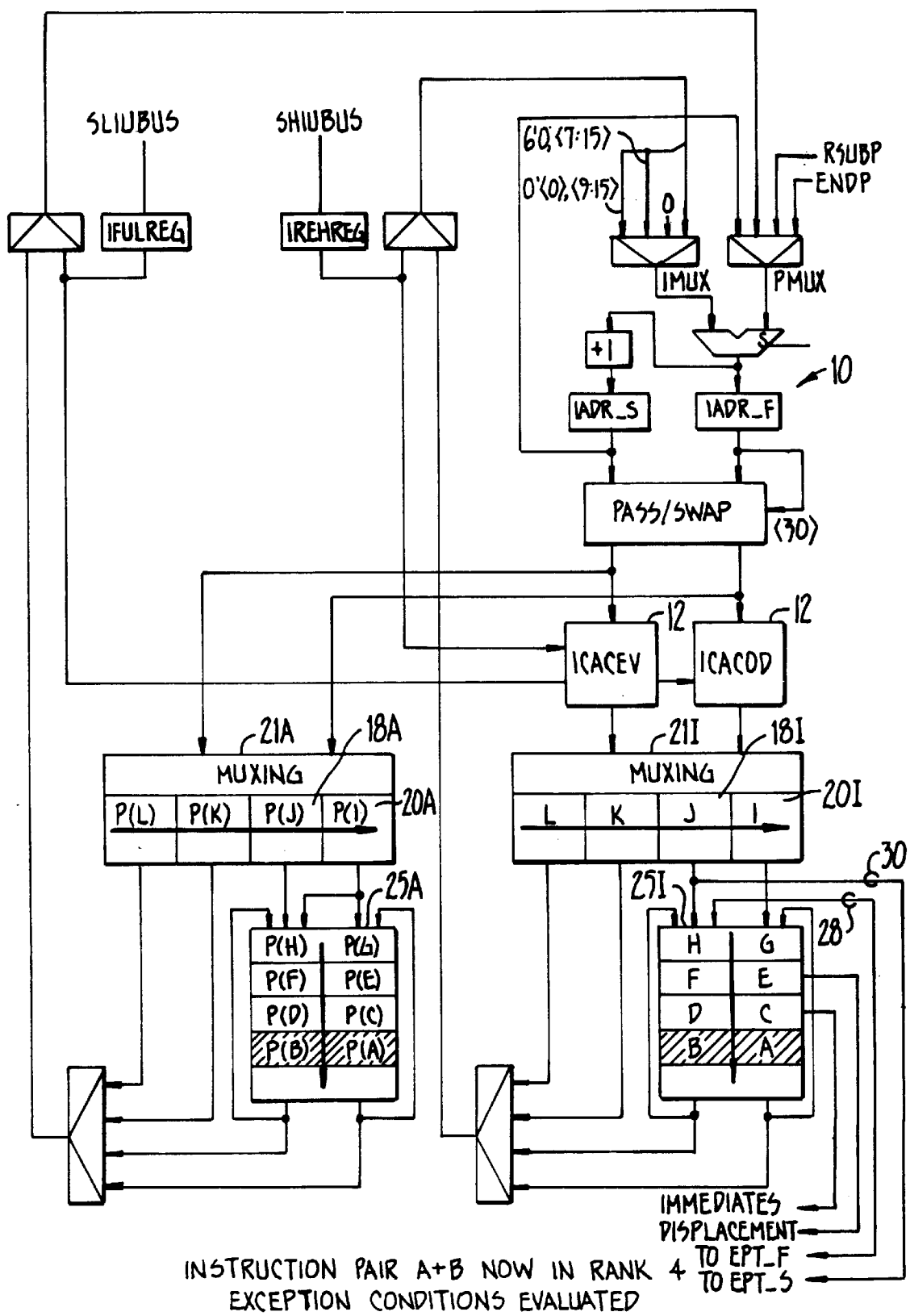
INSTRUCTION PAIR A+B NOW IN RANK 4
EXCEPTION CONDITIONS EVALUATED
*FIG._11F.*

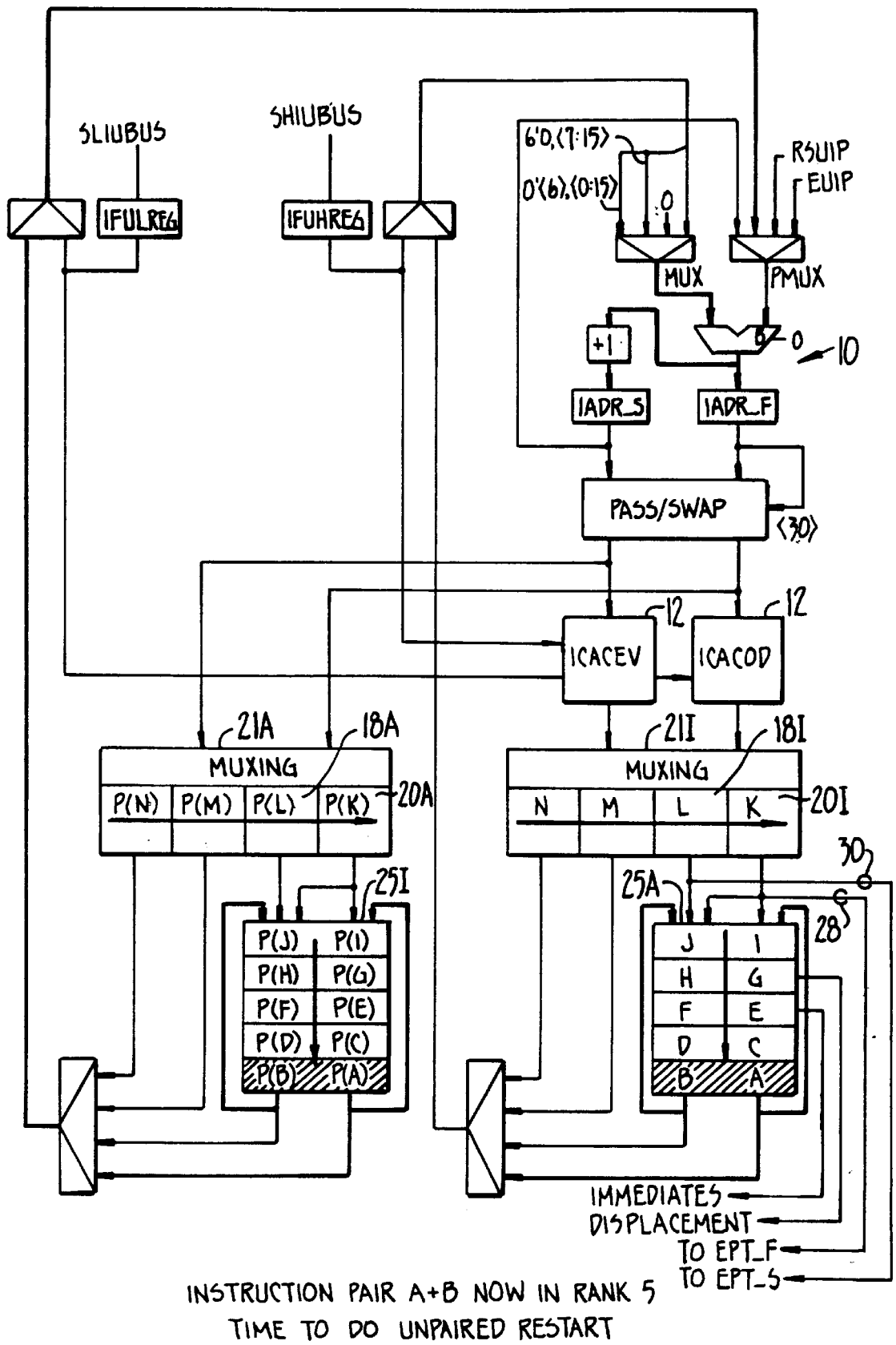
INSTRUCTION PAIR A+B NOW IN RANK 5
TIME TO DO UNPAIRED RESTART
FIG._11G.

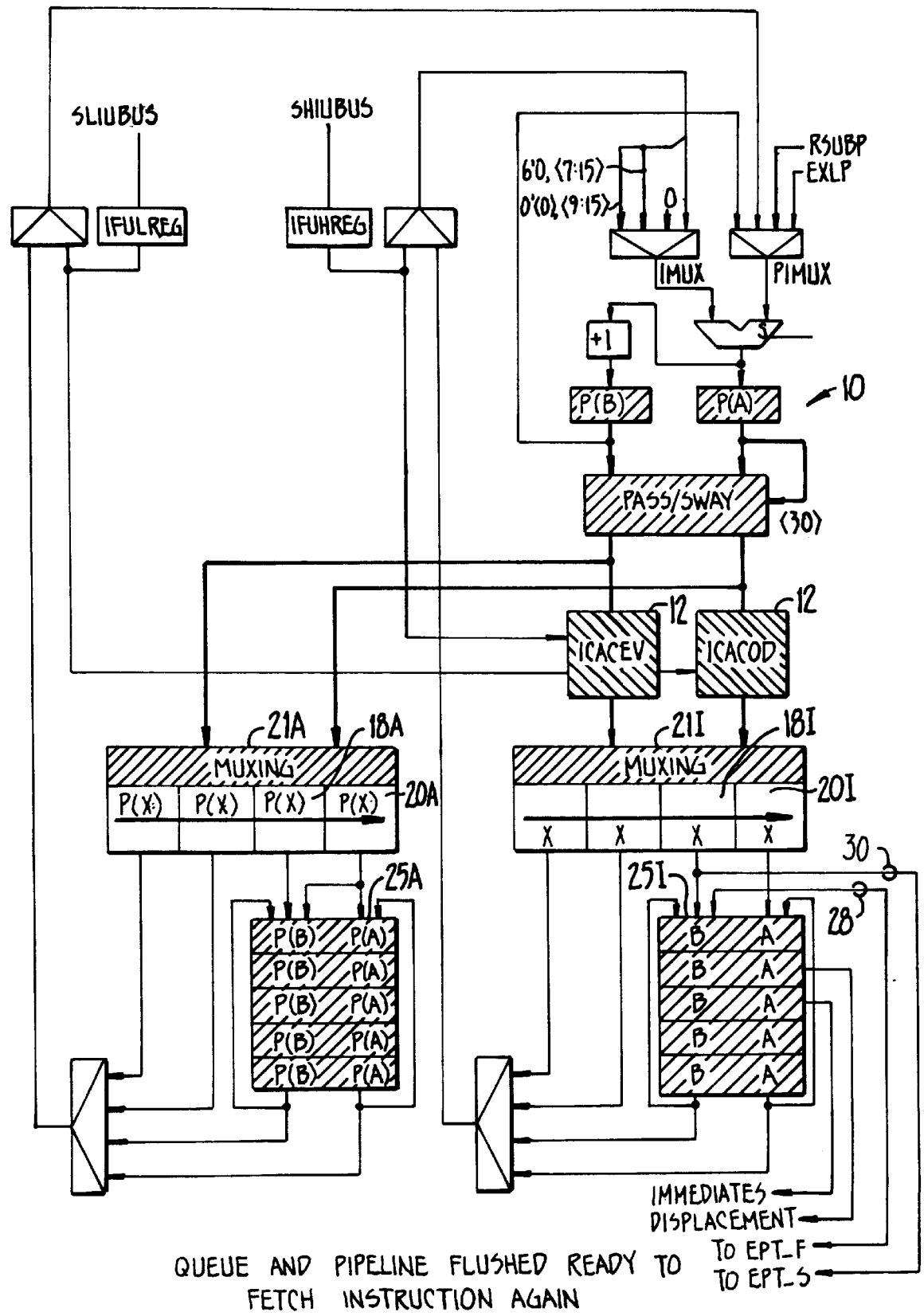
QUEUE AND PIPELINE FLUSHED READY TO FETCH INSTRUCTION AGAIN
FIG._11H.

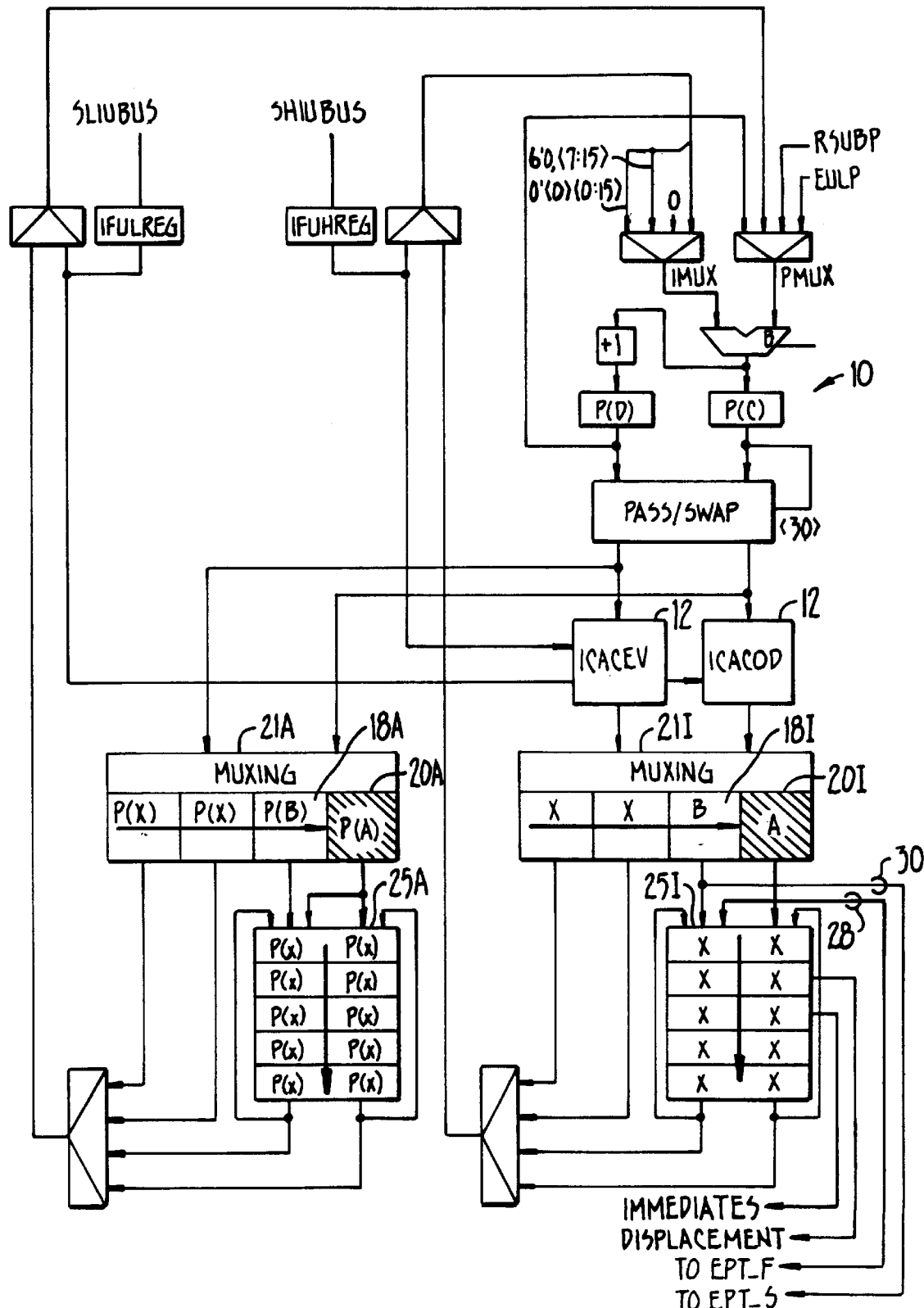
READY TO ISSUE INSTRUCTION AGAIN
ISSUE AS A SINGLE THIS TIME
FIG._III.

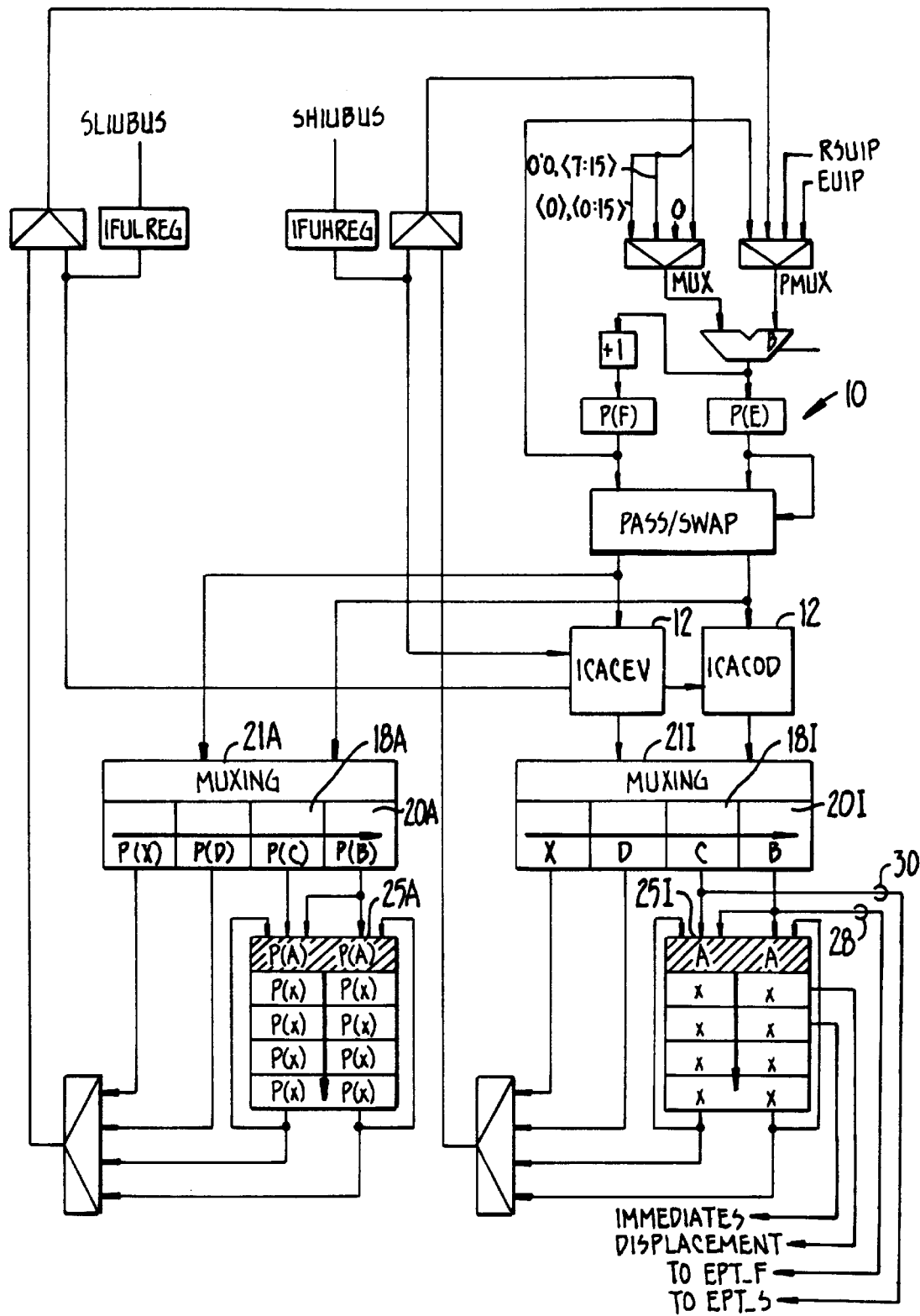
SINGLE INSTRUCTION BEGINS EXECUTION
HANDLE EXCEPTION THIS TIME
FIG._11J.

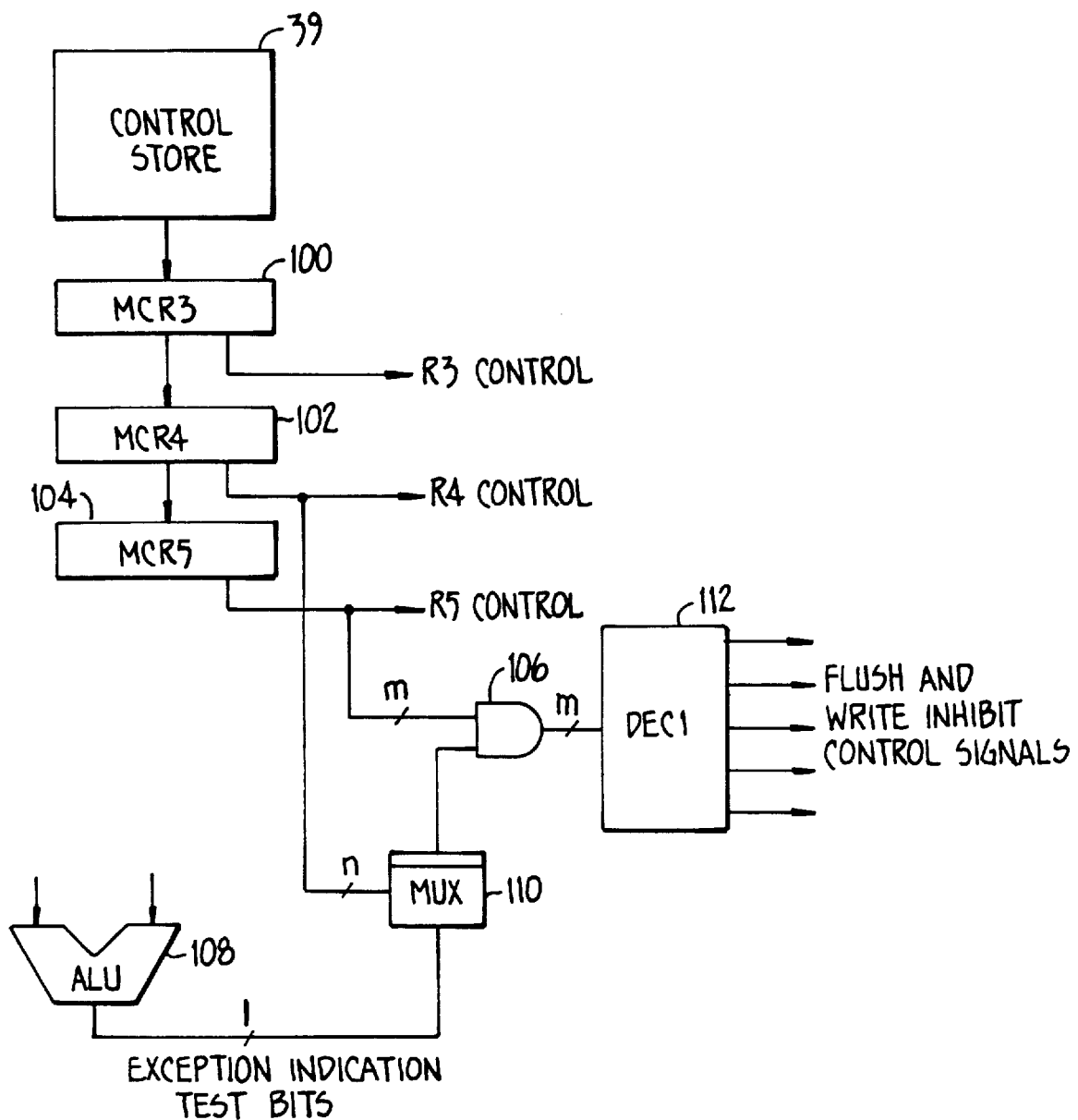
FIG._11K.

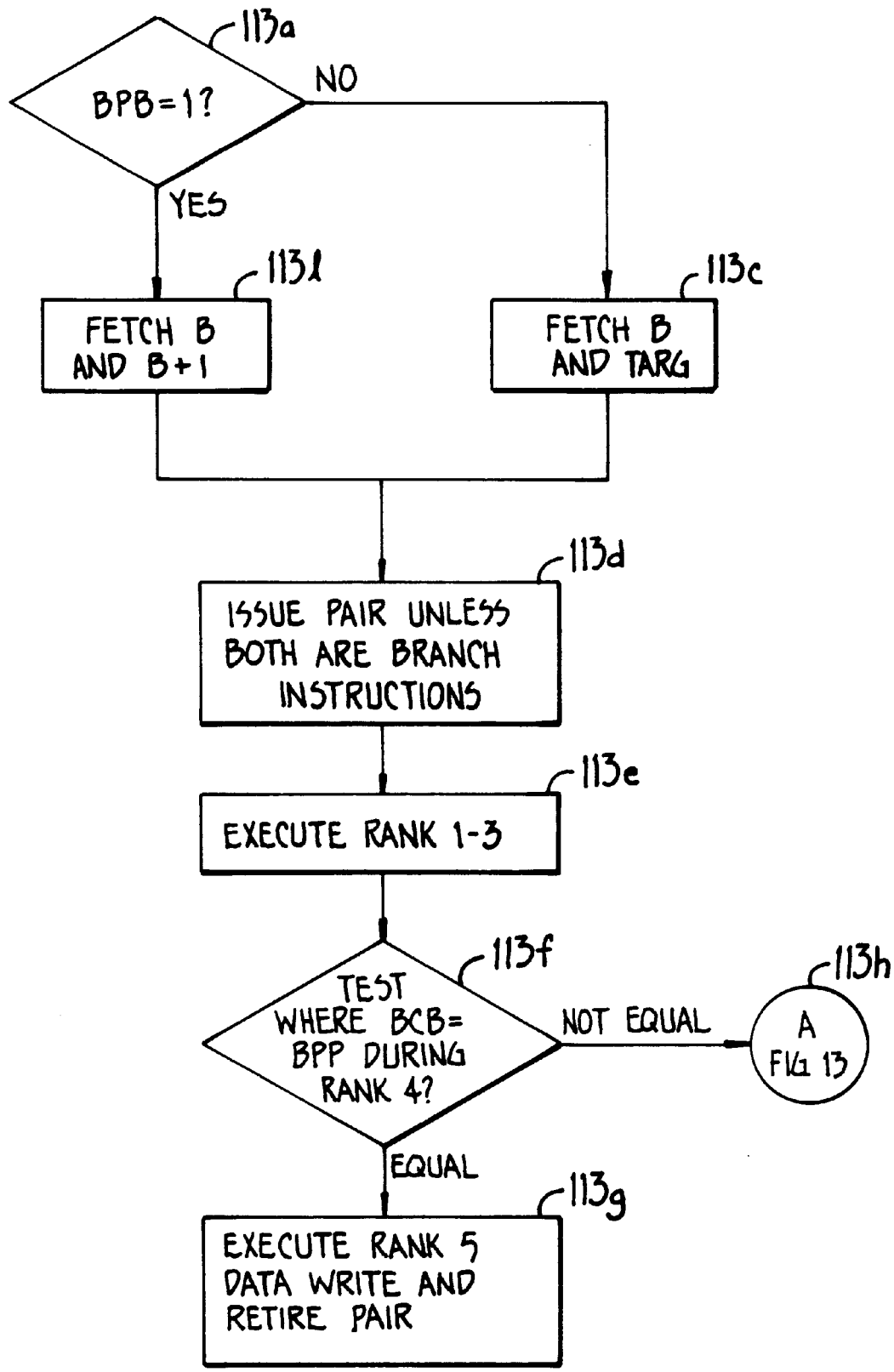
FIG._12.

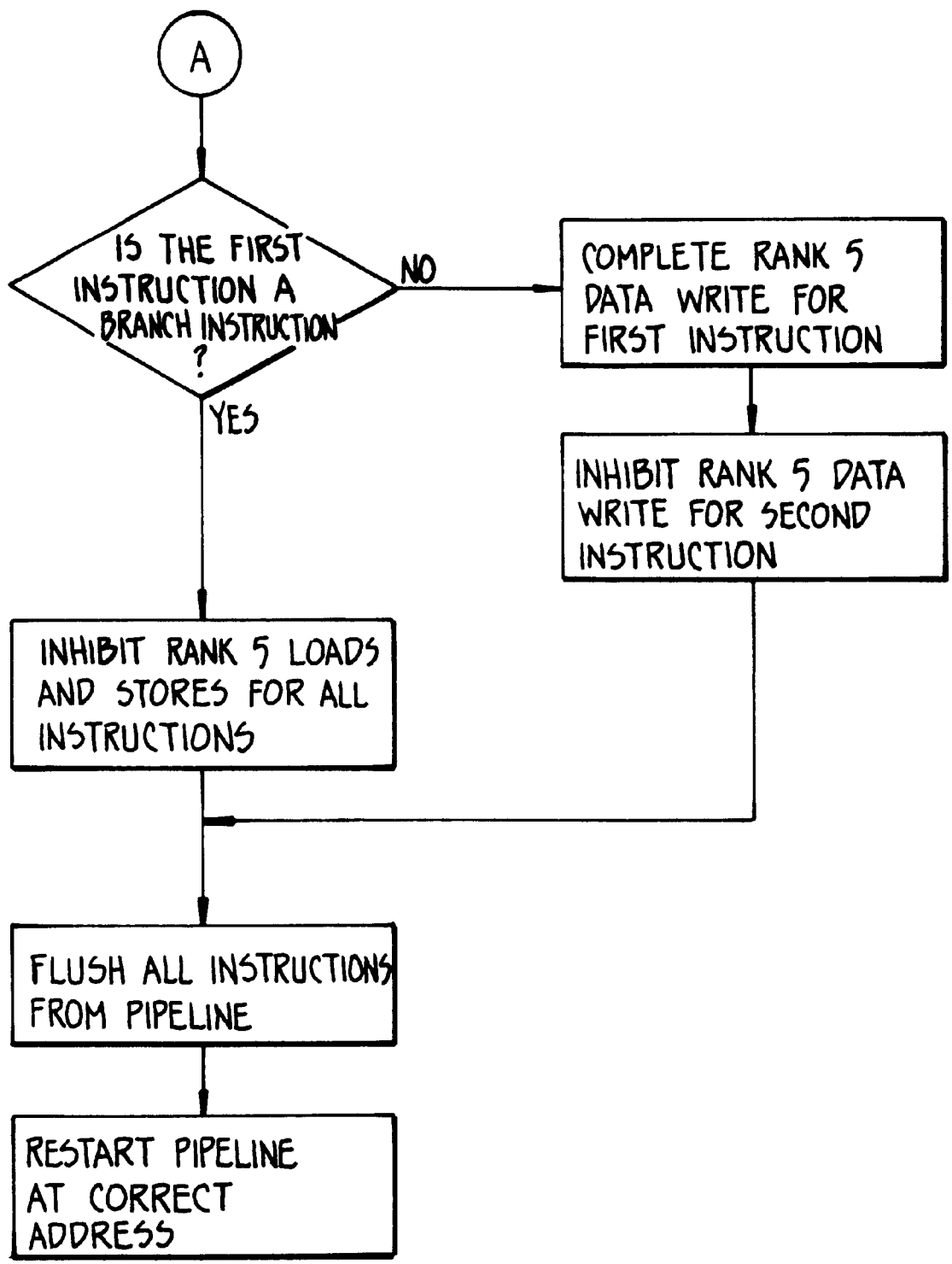
FIG._13.

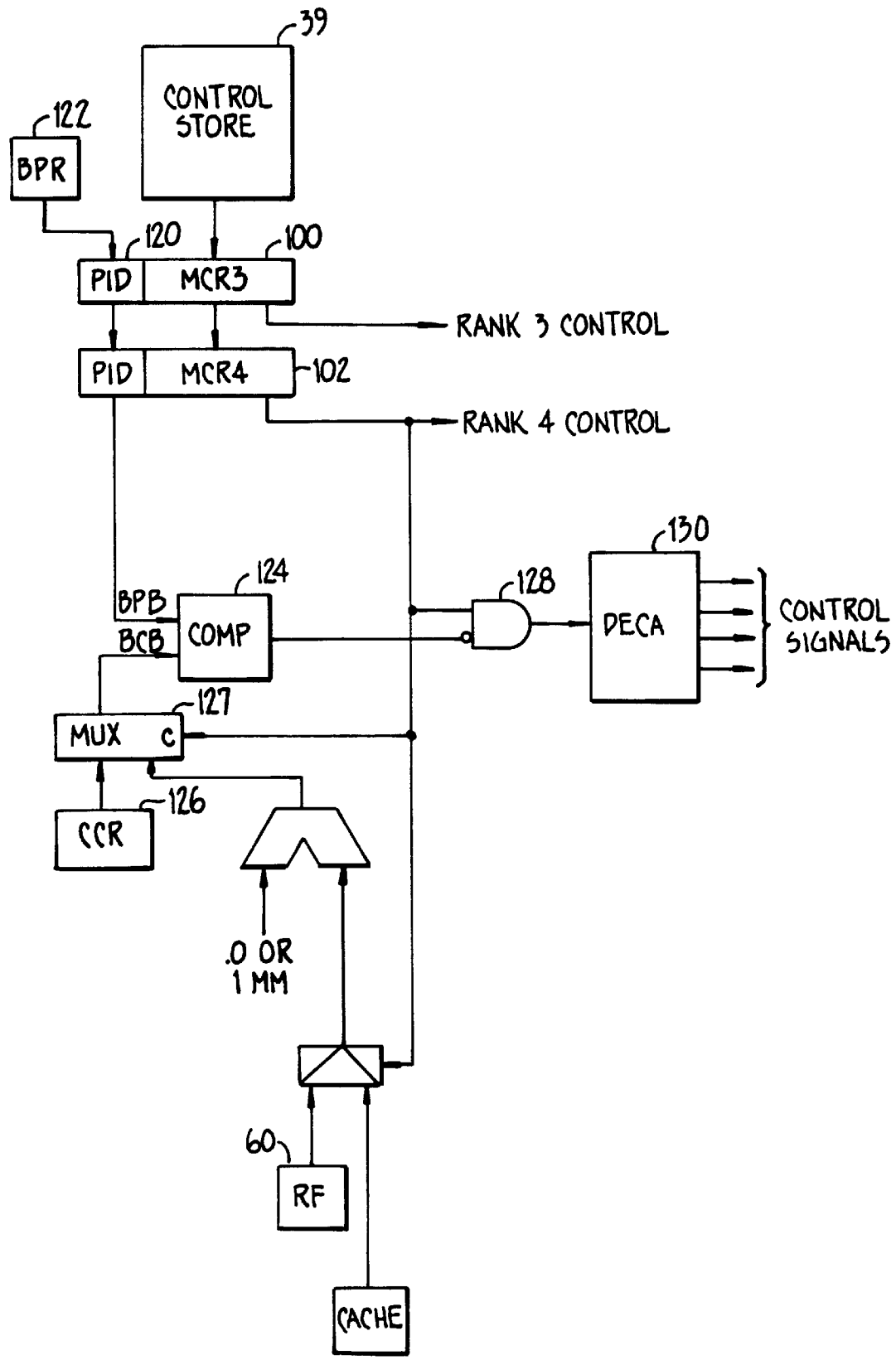
FIG._14.

COMPUTER ARCHITECTURE CAPABLE OF CONCURRENT ISSUANCE AND EXECUTION OF GENERAL PURPOSE MULTIPLE INSTRUCTIONS

This application is a division of and claims the benefit of U.S. application Ser. No. 08/959,643, filed Oct. 28, 1997, which is a continuation of U.S. application Ser. No. 08/710,620, filed Sep. 20, 1996, now U.S. Pat. No. 5,752,064, which is a continuation of U.S. application Ser. No. 08/483,661, filed Jun. 7, 1995, now U.S. Pat. No. 5,628,024, which is a division of U.S. application Ser. No. 08/300,815 now U.S. Pat. No. 5,574,941, filed Sep. 2, 1994, which is a continuation of U.S. application Ser. No. 07/890,299, filed May 27, 1992, now U.S. Pat. No. 5,390,355, which is a continuation of U.S. application Ser. No. 07/356,170, abandoned for FWC, filed May 24, 1989, the disclosures of which are incorporated herein by reference.

BACKGROUND OF THE INVENTION

1. Field of the Invention

The present invention relates generally to digital processors and, more particularly, to the instruction issuing and execution units of a digital processor.

2. Description of the Relevant Art

A primary goal in the design of digital processors is to increase the throughput, i.e., the number of instructions processed per unit time, of the processor. One approach has been to improve the hardware design of the processor to reduce the machine cycle time. Another approach has been to develop architectures and instruction sets designed to process one instruction per machine cycle. Both of these approaches are limited to a theoretical maximum throughput of one instruction per machine cycle due to basic policy of sequentially issuing at most one instruction per cycle.

Systems for issuing more than one instruction per cycle are described in a paper by Ditzel et al. entitled "The Hardware Architecture of the CRISP Microprocessor", 1098 ACM 0084-7495 87, pp. 309–319 and in a paper by Acosta et al. entitled "An instruction issuing Approach to Enhancing Performance in Multiple Functional Unit Processors", IEEE Transactions on Computers, Vol. C-35, No. 9. September 86, pp. 815–828.

One limitation on concurrent issuing of instructions is that the instructions must not require the use of the same functional unit of the processor during the same machine cycle. This limitation is related to the resources included in the processor architecture and can be somewhat obviated by providing additional copies of heavily used functional units.

The paper by Acosta et al. presents an approach to concurrently issuing instructions to take advantage of the existence of multiple functional units. Further, the CRISP architecture, described in the above-referenced paper, allows the execution of a branch instruction concurrently with another instruction. Additionally, mainframes have allowed concurrent dispatching of integer and floating point instructions to different functional units.

However, all of these systems require that the instructions issued concurrently not be dependent on each other. Types of dependencies will be discussed fully below, but a fundamental dependency between a pair of instructions is that the second instruction in the pair processes data resulting from the execution of the first instruction in the pair. Accordingly, the first instruction must be processed prior to the second.

Thus, these existing processors may concurrently issue and execute very few combinations of instructions. A branch instruction is a special case where no memory reference is required and requires only that a new address be calculated. Similarly, floating point and integer instructions require only ALU resources and no memory reference. Thus, data dependencies between the instructions do not exist.

In view of the above limitations, the type of instructions that may be concurrently issued in these systems is extremely limited and, although in certain limited situations two instructions may be issued in one clock, the average throughput cannot significantly exceed one clock per instruction.

SUMMARY OF THE INVENTION

In the present invention, a family of instructions is a set of sequential instructions in a program that may be issued concurrently in one clock. The number of types of instructions that may be included in a family is greater than allowed in prior art processors.

In the present invention, a family of instructions that includes, for instance, instructions of the ALU and memory reference type may be issued during a single clock. A special pipeline includes resources that facilitate the acceptance and processing of the issued family. Thus, the invention provides for an instruction processing throughput of greater than one instruction per clock.

According to one aspect of the invention, a family of instructions is fetched and decoded. The decode result for each instruction includes status information indicating which resources are required to execute the instruction. The family of instructions is issued in one clock if the status information indicates that no resource conflicts will occur during execution.

According to a further aspect of the invention, an execution unit executes a family of instructions having data dependencies by providing resulting data of a first instruction required as an operand of a second instruction prior to writing the resulting data to a register.

According to a still further aspect of the invention, a subset of the instructions of a selected instruction set are designated as candidates for concurrent execution. The status information in the decode results of each instruction in the family indicates whether the instruction is a candidate for concurrent execution. If the status information indicates that all the instructions in the family are candidates and that no resource conflicts will occur then the family is executed concurrently.

According to a further aspect of the invention, a unique exception handling procedure allows exception procedures developed for single instructions to be utilized thus simplifying the system. The system tests for the presence of an exception during the execution of a family. If an exception is detected then the data write associated with the family is inhibited to preserve the macrostate of the system. The instructions in the family are then issued singly so that the existing exception handling procedure may be utilized.

According to another aspect of the invention, a branch recovery mechanism for recovering from a branch misprediction tests for a misprediction by comparing the branch prediction bit and the branch condition bit. In the event of a misprediction, the mechanism differs depending on position of the branch instruction within the family. If the branch instruction is the last instruction in the family, then the pipeline is flushed and the correct next instruction is fetched into the pipeline. If the branch instruction is not the last instruction in the family, then the data writes associated with all instructions in the family following the branch must be inhibited, then the pipeline is flushed and the correct next instruction is fetched into the pipeline.

Other features and advantages of the invention will become apparent in view of the figures and following detailed description.

BRIEF DESCRIPTION OF THE DRAWINGS

FIG. 1 is a high-level block diagram of the invention;

FIG. 2 is a schematic diagram illustrating a specific example of sequential and concurrent execution of a first pair of instructions;

FIG. 3 is a schematic diagram illustrating a specific example of sequential and concurrent execution of a second pair of instructions;

FIG. 4 is a block diagram of a prior art three-stage pipeline;

FIG. 5 is a schematic diagram of a six-stage pipeline utilized in an embodiment of the invention;

FIGS. 6a and 6b are a schematic diagram of a multiported register file with bypass circuitry; and FIG. 7 is a schematic diagram of the pairing logic utilized in an embodiment of the invention;

FIG. 8 is a block diagram of the memory map of a microstore utilized in an embodiment of the invention;

FIG. 9 is a flow chart of an embodiment of the exception handling procedure of the present invention;

FIG. 10 is a flow chart of an embodiment of the unpaired restart procedure of the present invention;

FIGS. 11A–11J are detailed schematic diagrams illustrating the pipeline stages for exception and branch processing procedures of the present invention;

FIG. 11K is a block diagram of exception handling control system.

FIG. 12 is a flow chart of an embodiment of the branching procedure of the present invention; and FIG. 13 is a flow chart of an embodiment of the procedure for handling a branch misprediction.

FIG. 14 is a block diagram of a branch prediction mechanism control system.

DETAILED DESCRIPTION OF THE PREFERRED EMBODIMENTS

A preferred embodiment executes a target instruction set utilized by an existing processor not designed for issuing more than one instruction per cycle. Thus, the embodiment is downwardly compatible with the existing system and may operate programs written for the system. However, as will be demonstrated below, the ability of the present system to concurrently process families of instructions dramatically increases throughput.

A preferred embodiment is a microprogrammed machine where the control signals for implementing each object code, or macro, instruction are provided by a microcode routine unique to the instruction.

A subset of pair candidate (PC) instructions from the target instruction set is selected and special microcode routines for concurrently executing families of two PCs are stored in the control store. The selection of which instructions are included in the subset of PCs depends on various factors including the frequency of the occurrence of the instructions in application programs, the difficulty of concurrent execution of the instructions, and the resources required to concurrently execute the instructions. These special routines are dependent on special resources, to be described below, in the processor.

However, even for families consisting of only PCs, concurrent execution is not possible if resource conflicts occur. Accordingly, the system cancels concurrent execution in these instances. The execution unit is configured so that such instances occur infrequently and do not significantly reduce throughput.

The present system is object code compatible with non-pairing processors that execute the target instruction set. This requires that an object code program comprising an ordered sequence of object code instructions that is executed by the non-pairing machine must also be executed by the pairing machine without any modification to the program.

Thus, in the present system, ordered pairs of instructions occurring in the program are issued concurrently if predetermined conditions are satisfied. In a preferred embodiment the occurrence of these conditions are indicated by status bits generated when the instructions are decoded.

Referring now to the drawings, where like reference numerals identify identical or corresponding parts throughout the several views, FIG. 1 is a high-level block diagram of a preferred embodiment.

In FIG. 1, a fetch unit (FU) 10 is coupled to an instruction cache (IC) 12. The FU 10 includes address calculation hardware controlled by an address state machine that increments addresses during normal sequential operation and calculates branch target (BRANCH-TARG) addresses for conditional branch and jump instructions. The output of the IC 12 is coupled to instruction queue registers (IQR) 14 and 16. The IQRs 14 and 16 and first and second rank 0 pipeline registers (ROS and ROF) 18 and 20 are connected in series to form an instruction queue 21. The outputs of ROS and ROF 18 and 20 are coupled, respectively, to the inputs of first and second rank 1 registers and to the inputs of a second decode unit and a first decode unit (DCS and DCF) 24 and 22. The output of the two decode units 22 and 24 are connected to the data inputs of a pairing logic unit (PLU) 26 by first and second decode output (DCO) buses 28 and 30. Status bits on these buses are connected to control inputs of the PLU 26 by first and second status buses 32 and 34. The PLU 26 includes a data output coupled to an execution unit (EU) 36 by a merged decode bus (MDB) 38, an FU control output coupled to the FU 10 by a fetch unit control (FCU) pipeline unit bus 40, and a control output coupled to the pipeline unit (PU) 25 by a pipeline unite control (PUC) bus 42. The EU 36 also assert the below described FIssue signal.

The operation of the system of FIG. 1 will now be described. The first and second instructions in the family of instructions are stored in ROF and ROS 20 and 18, respectively. These instructions are decoded at the respective decode units 22 and 24 and the decode results are output on the respective DCO buses 28 and 30. The first decode result includes a first entry point field (EPT-F) and a first set of status bits and the second decode result includes a second entry point field (EPT-S) and a second set of status bits. The status bits in each decode result indicate whether the respective instruction is a PC and what resources are required to execute the instruction. The status information from both decode results is routed to the PLU control ports on the status buses 32 and 34.

A first status bit is designated PC and indicates whether the instruction is a pair candidate. A second status bit is designated EPTIssue and indicates whether the macro instruction requires only a single clock or requires multiple clocks. If multiple clocks are required, then the following instruction may be issued during the next clock. If only a single clock is required, then the data in ROF and ROS 20 and 18 doesn't change until an FU issue occurs. This signal is received by the FU 10 to restart prefetching. Other status bits indicate whether the instruction requires the ALU or memory addressing logic to execute.

The output of the PLU 26 depends on the status information and will be one of three possibilities. First, if the first instruction is not a PC the decode result of the first instruction is output on the MDB 38 to access the microcode routine for singly executing the first instruction. Additionally, the signals issued on the FUC line 40 and the PUC line 42 cause a next single instruction to be fetched from the IC 12 and only the first instruction (stored in ROF 20) to be issued to the next stage of the PU 25. Thus, the concurrent issuing capability of the processor is not used.

Secondly, if both the first and second instructions are PCs and are pairable, i.e., no resource conflicts exist, the decode results of the first and second instructions are merged and output on the MDB 38. The merged decode results access microcode for executing the first and second instructions as a pair. Additionally, the signals issued on the FUC line 40 and the PUC line 42 cause the next two instructions in the program to be fetched from the IC 12 and the pair of instructions stored in the Rank 0 registers 18 and 20 to be issued to the next stage of PU 25.

Third, if the first instruction is a PC, but the first and second instructions are not pairable, e.g., because of a resource conflict, a subfield of the decode result of the first instruction is output on the MDB 38 to access a microcode routine for singly executing the first instruction. Additionally, the signals issued on the FUC line 40 and the PUC line 42 cause a next single instruction to be fetched from the IC 12 and only the first instruction to be issued from the ROF register 20 to the next stage of the PU 25. Thus, the concurrent issuing capability of the processor is not used.

The operation of the system is best understood by considering concrete examples. These examples are for a processor that utilizes a stack as the data source and data sink for ALU operations. Data is transferred between memory and the stack by load and store operations. The stack includes eight physical registers (R0–R7) and a register pointer (RP) which points to the physical register logically assigned to the top of the stack. The stack registers are given logic designations A–H, defined by the value of RP, with the register at the top of the stack designated A. In this type of processor, data dependencies are characterized by stack register conflicts. Another type of dependency is an RP conflict. Instructions generally increment or decrement RP. Thus, a family of instructions may have conflicting requirements for the change of RP.

FIGS. 2 and 3 are schematic diagrams depicting the stack configurations resulting during the execution of a family of two instructions in a standard manner and listing a routine for concurrently executing the instructions according to the present invention.

Referring to FIG. 2, the stack configurations for the sequential single execution of an LDI-LOAD family of two instructions are depicted. Both of these instructions write data to the H register defined relative to the RP. During the execution of LDI, immediate data is written to H (RO) and RP is incremented to change H to R1. Then, during the execution of LOAD, cache data is written to H and RP is incremented again to change H to R2.

In terms of a standard three stage pipeline depicted in FIG. 4, each of these instructions writes data to the H register and increments RP during the R3 pipeline stage. Thus, concurrent execution would not be possible without special resources and techniques to obviate the effects of these register and RP conflicts.

The concurrent execution of the pair is described in terms of the relatively deep six stage pipeline, utilized in the preferred embodiment, depicted in FIG. 5. To concurrently execute the pair, the data cache address for the load instruction is generated during Rank 2, the operands are fetched, cache data is written to G (R1) and immediate data is written to H (R0) during Rank 3, and RP is increased by 2 to define R1 as A and R2 as H during Rank 4. Thus, the microcode and resources of the present invention allow concurrent issuance and execution of the pair of instructions.

Referring to FIG. 3, the stack configurations for the sequential single execution of an LDD-DADD family of two instructions are depicted. Referring again to the three stage pipeline of FIG. 4, during execution of LDD, RP is incremented to define A as R2, the high field of OP-2 data is written to A (R2), and the low field of OP-2 data is written to H (R3) during Rank 2. Finally, RP is incremented again to define A as R3 during Rank 3. Then, during the execution of DADD, the data in C (R1) and in A (R3) are summed and written to C (R1) and the data in D (R0) and B (R2) are summed and written to D (R0) during Rank 2 and RP is decremented by 2 during rank 3.

In terms of the three stage pipeline of FIG. 4, if the pair were executed concurrently the writing of data and summation of data would occur during rank 3 thereby causing an unresolvable data conflict. A further conflict would occur during rank 3 because of conflicting requirements for changing RP.

Referring to the six stage pipeline of FIG. 5, to concurrently execute the pair, OP-2 data is read from the data cache during Rank 3, summed with the contents of registers A (R1) and B (R0) during Rank 4, and the sum written to A (R1) and B (R0) as well as the original OP-2 data written to H (R2) and G (R3) during Rank 5. Thus, no unresolvable register or RP conflicts occur.

From the above it is clear that concurrent execution requires access to data before it is written to registers in the stack. FIG. 6 depicts a register configuration facilitating the required access. In FIG. 6 a register file 60 includes four write ports and four read ports to allow concurrent transfer of double words. Additionally, bypass circuitry 62, bypass buses 64, wide muxes and cross connections 65 between cache data 65a, immediate data 65b, and the ALU input buses 65c and SBus 65d allow direct access to data prior to its being written to the register file 60. Thus, the deep pipeline and multiported register file 60 allow microcode to execute many combinations of instructions as families.

For example, during the execution of the LDD-DADD pair illustrated in FIG. 3, the cache data is transferred directly, during Rank 3, from the data cache 66 to the CDHi 67a and CDLo 67b registers prior to being written to the register file while OP-1 H is transferred from RegA to KEReg 67c and OP-1 L is transferred from RegB to KLReg 67d. The sum of transferred data is calculated by the ALU 68 during Rank 4 and written to RegA and Reg B during Rank 5. Additionally, the data in CDHi 67a and CDLo 67b is written to RegH and RegG during Rank 5.

For example, a family including a load and load immediate instruction can be issued during one clock and processed. Similarly, a family including a load and an add instruction can be issued during one clock and processed.

FIG. 7 is a detailed block diagram illustrating the architecture of an embodiment of the invention. The decode units are entry point tables (EPTs) 22 and 24 that respond to the instructions in ROF and ROS 20 and 18 to generate first and second entry points EPF and EPS.

The output of the EPTs 22 and 24 are coupled, respectively, to the first and second DCO buses 28 and 30. The first entry point EPF bit field F<0:15> is transferred from EPTF 22 to the first DCO bus 28 and the second entry point EPS bit field S<4:15> is transferred from EPTS 24 to the second DCO bus 30. The bit field F<1,2,14,15> is transferred to the Pairing Logic 72 by the first status bus 32 and the bit field S<5,6,7,8> is transferred by the second status bus 34.

The bit field F<9:15> is transferred to the 0 input of a MUX/LOGIC UNIT (MLU) 74 by an FLSB bus 76 and the bit field S<9:15> is transferred to the 1 input of the MLU 74 by an SLSB bus 78.

The bit field F<2:8> is transmitted on an MMSB bus 80 and the output of the MLU 74 is transferred to an MLSB bus 82. The MMSB and MLSB buses 80 and 82 are merged to form MSB and LSB sections of the merged EPT (MEPT) bus 38. The MEPT is used to access microcode from a microstore 39.

The Pairing Logic generates PC and EPTIssue signals, transferred on FUC bus 40, that direct the pipeline to issue an instruction pair or a single instruction. Additionally, a NonPaired PC (NPPC) signal is transmitted on an PCNP line 84 coupled to the 09 input of the MLU 74 and the bit F<2> is transmitted on a mux control line 86 to the control input of the MLU 74.

FIG. 8 is a memory map of the microstore 39 addressed by MEPT<2:15>. The MSB field of the MEPT is always equal to F<2:8> where F<2> is the MSB. The LSB field of the MEPT is equal to the output of MLU 74 and depends on the signals on the NPPC and mux control lines 84 and 86. The MSB, F<2>, of all PCs has a value of 1 and for all non-PCs has a value of 0.

For a first instruction that is not a pair candidate the MSB, F<2>, is 0 and the microcode address (MEPT) is located in the lower half 90 of the address space 92. For a first instruction that is a pair candidate the MSB, F<2>, is 1 and the microcode address (MEPT) is the upper half 94 of the address space.

The operation of the system depicted in FIG. 7 to generate the MEPT for the cases where the first instruction is a not a pair candidate, is a pair candidate but is not paired, and is a pair candidate and is paired will now be described.

If the first instruction is not a pair candidate then F<2> is 0 and the 0 input of the MLU 74 is coupled to the MLSB bus 82 so that the field F<9:15> is transmitted on the MLSB bus 82 and the MEPT is:

$$MEPT<2:15>=F<2:8>:F<9:15> \qquad \text{Eq. 1}$$

so that MEPT is equal to the EPTF field. This address is in the lower half 90 of the address space 92 depicted in FIG. 8. Thus, the MEPT in this case accesses microcode for executing the first instruction as a single.

If the first instruction is a pair candidate but is not pairable with the second instruction then F<2> is 1 and the signal on the NPPC line 84 is set. In this case the MLU 74 transfers the field <0000000> to the MLSB bus 82 and the MEPT is:

$$MEPT<2:15>=F<2:8>:<0000000> \qquad \text{Eq. 2}$$

so that the MEPT is equal to the MSB field of the EPTF followed by a string of seven zeros. Thus, the address of the microcode for executing a non-paired pair candidate is located in the upper half 94 of the address space 92 depicted in FIG. 8.

If the first instruction is a pair candidate and paired then F<2> is 1 and signal on the NPPC line 84 is not set. In this case the MLU 74 transfers the field S<9:15> to the MLSB bus 82 and the MEPT is:

$$MEPT<2:15>=F<2:8>:S<9:15> \qquad \text{Eq. 3}$$

so that the MEPT is equal to the LSB field of the EPTS and the MSB field of the EPTF. As depicted in FIG. 8, these addresses follow the address of the unpaired instruction in the address space.

Subsequent to the issue of an instruction pair, events, such an exception or branch misprediction, may occur that prevent the successful execution and retirement of the issued instruction pair. The following is a description of unique exception handling and branching techniques for efficiently coping with the occurrence of these events.

Turning first to exception handling, an exception is caused by a condition internal to the processor that prevents the execution of an instruction. Examples of such conditions include arithmetic overflows for ALU type instructions and page faults for memory reference type of instructions.

For each instruction that may encounter an exception, special exception handling procedures that may include software and/or microcode, have been developed for singly issued instructions. Generally, the exception handling microcode is much more complicated than the microcode required to implement the same instruction in the absence of an exception.

In terms of the six stage pipeline depicted in FIG. 5, the exception condition occurs during rank 4 of the pipeline. Since exceptions occur when instructions are paired, one approach to exception handling would be to store special microcode for handling exceptions for each possible instruction pair.

However, such an approach has several drawbacks. Since instructions prior to the one that encounters the exception must be allowed to complete, complex fix-up code would be required in some cases to allow stores associated with the first instruction to complete while preventing stores associated with the second instruction in the pair. Further, it is possible that more than one exception could be encountered. For example, the pair (LOAD and ADD) might encounter a page fault exception for the LOAD and an overflow exception for the ADD. Additionally, the number of exception combinations becomes very large and makes the pair exception procedures extremely difficult to debug.

The present solution utilizes the exception handling procedures already existing for handling exceptions for singly issued instructions. The microcode for implementing the pair detects an exception by testing for the presence of an exception condition during rank 4 of the pipeline. An instruction pair is issued 90 and ranks 1–3 of the pipeline are executed 92. This procedure is depicted in the flow chart of FIG. 9. If an exception is detected 94 then the unpaired restart procedure is called 96 to abort the instruction pair and reissue the first instruction in the pair singly. If there is no exception the instruction pair is retired 98.

For the existing exception handling procedures to be utilized, it required to present an internal macrostate to the single instruction exception handling procedure consistent with the macrostate that would have occurred if the program were being executed by a non-paired instruction machine.

This consistent macrostate is presented by an unpaired restart procedure, depicted in the flow chart of FIG. 10, that includes the step of inhibiting 99 the loads and stores that occur during rank 5 if an exception is detected in rank 4. Thus, the contents of the stack registers are not changed and the internal macrostate is the state resulting from the execution of the instruction in the program that immediately precedes the aborted pair. This macrostate is consistent with the state that would be presented to the exception handling procedures if the program were executed by a non-paired instruction machine.

In addition to inhibiting the loads and stores of rank 5, the unpaired restart flushes the pipeline and reissues 99a and 99b the first instruction of the pair as a single. If the exception was associated with the first instruction, then the singles microcode will again encounter the same exception and can handle the exception as in a non-paired instruction machine.

If the exception was associated with the second instruction, then the first instruction will complete without incident and the second instruction will again encounter the exception. If the second instruction is not paired this time then the singles microcode will handle the exception. If it is paired then another unpaired restart will occur.

Although the unpaired restart procedure reduces throughput, the relative infrequency of exception occurrence makes this penalty acceptable in view of the tremendous reduction in complexity.

FIGS. 11A through 11G depict the various pipeline stages and procedures for handling an exception while a pair of instructions is executing.

In FIG. 11A, the pipeline 25 is divided into instruction and address sides that include instruction and address queues 21I and 21A and instruction and address rank register sets 25I and 25A. Additionally, an instruction mux 90I and an address mux 90A selectively couple the outputs of the IQ2 and IQ3 registers and rank 5 registers of the instruction and address sides, respectively, to the address calculation hardware of the FU 10. In FIGS. 11B through 11G buses and registers that are enabled are indicated by bold lines.

In FIG. 11B, the instruction pair A+B is ready to issue and is output from the rank 0 registers 18I and 20I of the instruction side and the addresses of A and B from the rank 0 registers 18A and 20A on the address side. The bits of the instructions are transferred to the EPTs on DCO buses 28 and 30.

FIGS. 11C through 11F depict the progress of the instruction pair from rank 1 to rank 4. At rank 4 the microcode tests for an exception such as the setting of an arithmetic overflow bit or a page fault. If no exception is detected the pair continues through rank 5 and is retired. This testing may be implemented by a conditional branch in the microcode that utilizes an exception status bit as a branch condition bit. For example, an exception indicating bit could be the arithmetic overflow bit stored in a condition code register.

FIG. 11G illustrates the unpaired restart procedure. The microcode controls the address mux 90A to transfer the address of instruction A to the address calculation hardware in the fetch unit 10. Additionally, the pair A+B and their addresses are loaded into the rank 1 through 5 registers of the instruction and address sides respectively to begin the flush of the pipeline.

In FIG. 11H, the instruction calculating hardware in the fetch unit 10 accesses the instruction A from the IC 12 and the microcode controls the IQ muxes to route the instruction to the instruction R0 registers 20I and the instruction address to address R0 register 20A.

In FIG. 11I, instruction A and its address have been transferred to the instruction ROF and the address ROF 20I and 20A, respectively.

In FIG. 11J, instruction A has been reissued as a single.

FIG. 11K is a block diagram of a control system for implementing the unpaired restart procedure. Referring to FIG. 11K, the output of the control store is coupled to an MCR3 register 100 which, in addition to MCR4 and MCR5 registers 102 and 104, form a microcode pipeline which operates in synchronism with the instruction pipeline 25 to provide required control signals to execute the instruction families in the pipeline. The rank 4 microcode includes an m-bit field which is coupled to the first input port of an AND gate 106. An exception indication test bit field generated by ALU 108 of the EU 36 is coupled to the input of a latched MUX 110. The control port of MUX 110 is coupled to a control field of the rank 5 microcode and the output is coupled to the second input port of the AND gate 106. The output of the AND gate 106 is coupled to the input of a first decoder (DEC1) 112. The outputs of DEC1 are the control signals which cause the pipeline to be flushed and the Rank 5 write operations to be inhibited in the event that an exception condition is detected.

The operation of the system depicted in FIG. 11K will now be described. The control field of rank 5 microcode causes the MUX 110 to transmit the particular exception indication test bit to be tested for the instruction family being executed. If an exception condition has occurred then the transmitted test bit is a logical "1", AND gate 106 is open, and the m-bit Rank 5 microcode field is decoded to generate the control signals for implementing the unpaired restart procedure. If the exception condition has not occurred then the transmitted test bit is a logical "0", the AND gate 106 is closed, and the outputs of the decoder do not cause the unpaired restart procedure to be implemented.

The procedure for handling branch instructions will now be described with reference to the flow charts of FIGS. 12 and 13. As in many pipelined systems, a branch prediction ram (BPR) is included. For each branch instruction the state of a branch prediction bit (BPB) in the BPR indicates the value of the branch condition the last time the associated branch instruction was executed. It is assumed that the branch condition bit will again have the same value. Referring to FIG. 12, the BPB is tested 113a and if the BPB predicts that the branch will not be taken then prefetching continues in order of ascending addresses 113b. If the branch is predicted taken, then prefetching stops while the address of the target address is formed. Once this target address is formed, prefetching resumes at the target location 113c.

As described above with reference to FIG. 7, the MEPT is uniquely determined by the bits of the first and second instructions in a pair and reflects the order of the instructions, i.e., the MSB field includes bits from the EP of the first instruction and the LSB field includes bits from the EP of the second instruction. This unique MEPT accesses microcode that includes an indication of whether the first or second instruction is the branch instruction.

The branch condition is evaluated at rank 4. The BPB moves through the pipeline 113d and e as a PipeID bit along with the pair or instructions and is compared 113f to the branch condition bit (BCB) set by a previously executed instruction. If the BPB and branch condition bit match, then the contents of the pipeline are correct, normal processing continues 113g, and the instruction pair is retired. If the BPB and BCB do not match 113h, then the following instructions in the pipeline are incorrect and branch recovery must occur.

Referring now to FIG. 13, the first step in branch recovery depends on whether the branch instruction is the first or second instruction in the pair. As described above, the microcode routine is different for the two cases. If the mispredicted branch instruction is the first instruction of the pair, then the rank 5 stores of the second instruction must be inhibited because that instruction is not the instruction that is to be executed subsequent to the first instruction. Additionally, all subsequent instructions are flushed from the pipeline and any updates required for the branch are redone.

If the mispredicted branch instruction is the second instruction of the pair, then the Rank 5 stores associated with the instruction pair are completed. The remaining stages of the pipeline and the prefetch queue are flushed as before.

In the case of a branch misprediction, a new address must be formed to resume prefetching at the location of the correct next instruction the follows the branch instruction in the program.

TABLE 1

| Branch is First/Second | Branch was Predicted Taken? | Next Address |
| --- | --- | --- |
| First | Yes | R5PF + 1 |
| First | No | TARG of R5PF |
| Second | Yes | R5PS + 1 |
| Second | No | TARG of R5PS |

Address recalculation is required only when the BPB does not match the BCB. Since the branch prediction was incorrect the instructions in the pipeline following the branch instruction are incorrect. Thus, if the BPB indicates that the branch is taken then the address of the instruction in the pipeline following the branch instruction is BRANCH-TARG. However, the following instruction address should be BRANCH +1. Similarly, if the BPB indicates that the branch is not taken then the address of the instruction in the pipeline following the branch instruction is BRANCH+1. However, the following instruction address should be BRANCH-TARG.

Referring to Table 1, in the first row the microcode indicates that the first instruction in the pair, now resident in register R5I-F of the pipeline, is the branch instruction. Since the BPB mispredicted that the branch would be taken, the address of the next instruction should be BRANCH+1 instead of BRANCH-TARG.

Referring back to FIG. 11A, the address of the branch instruction, now resident in register R5P-F, is transferred to the address calculation hardware of the FU 10 via the address is side MUX 90A. This address incremented to form the address, BRANCH+1, of the next instruction to be fetched.

In the second row of table 1 the microcode indicates that the first instruction is the branch instruction. Since the BPB mispredicted that the branch would not be taken, the address of the next instruction should be BRANCH-TARG instead of BRANCH+1.

Referring to FIG. 11A, the branch instruction and its address, now resident in registers R5I-F and R5P-F, respectively, are routed to the address calculation hardware of the FU 10 via the instruction side and address side MUXes 90I and 90B. The address calculation hardware then calculates the address, BRANCH-TARG, of the next instruction to be fetched.

FIG. 14 is a block diagram of a control system for implementing the branch prediction mechanism. The control store 39 and MCR3, MCR4, and MCR5 registers 100, 102, and 104 are coupled as described above with reference to FIG. 11K. Additionally, each rank of the control pipeline includes a Pipe ID (PID) register 120 which stores certain information regarding the instruction being executed. A branch prediction RAM (BPR) 122 has an output coupled to the PID register 120 so that a branch prediction bit (BPB) is propagated through the pipeline for a branch instruction being executed. The BPB stored in the Rank 4 PID register 120 is coupled to a first input of a comparator 124 and a branch condition bit stored in a condition code register 126 or transferred from the ALU is coupled to the second input of the comparator 124. An n-bit field of the Rank 4 microcode is coupled to the first input and the output of the comparator 124 is coupled to the second input of an AND gate 128 via MUX 127. MUX 127 is controlled by a control field of the Rank 4 microcode. The output of the AND gate 128 is coupled to the input of a decoder (DECA) 130. The outputs of DECA 130 are the control signals which cause the branch prediction mechanism to be implemented.

The operation of the system depicted in FIG. 14 will now be described for four separate cases. The first two cases relate to conditional branch instructions where the BCB is a bit set in the condition code register 126 by a previously executed instruction. The two cases are distinguished by whether the previous instruction was included in a previously executed family or in the current family that includes the branch instruction.

The second two cases relate to a conditional branch instruction where the BCB is calculated by the ALU using data stored in the register file, for example RegA, by a previously executed instruction. Again the two cases are distinguished by whether the previous instruction is included in the current family. In the first case, the BCB in the condition code register 126 has been set during the execution of a previous instruction. If the BCB and the BPB from the PID 120 register do not match then the branch was mispredicted and the output of the comparator 124 opens AND gate 128. The n-bit Rank 4 microcode field is then passed to DECA 130 to generate the control signals required to implement the branch prediction mechanism. As described above, the n-bit field indicates the position of the branch instruction in the family and thus the output of the decoder will differ depending on this location.

If the BCB and BPB match then the output of the comparator 124 closes AND gate 128 and the control signals for implementing the branch recovery mechanism are not generated because the contents of the pipeline are correct.

If the BCB is a bit from the condition code register 126 that is being written by an instruction in the current family then the BCB bit must be provided to the comparator 124 prior to being written to the register file. The MUX 127 is controlled to provide the output of the ALU directly to the comparator 124 during Rank 4 and then the BCB is written to the condition code register during Rank 4.

If the BCB is calculated by the ALU and the register data was written by an instruction in a previous family, the register data is transferred to the ALU and the ALU output is transferred to the comparator 124 via the MUX 127.

If the register data is generated by an instruction in the current family, the data is provided to the ALU, utilizing the hardware described with reference to FIG. 6, prior to being written to the register file and the ALU output is transferred to the comparator 124 via the MUX 127 during Rank 4. The data is then written to the register file during Rank 5.

The invention has been described for a system for concurrently executing families of two instructions, however the principles of the invention are equally applicable to families of more than two instructions. The pairing logic would be modified to respond to more than two status fields and special microcode routines would be written to concurrently execute the family.

Additionally, although a microcoded processor has been described the system is applicable to machines using logic arrays to generate control signals. Both systems have advantages in certain situations and the choice is not critical to practicing the invention. Further, a register configuration other than a register stack can be utilized.

The status bits described with reference to FIG. 7 are used by the pairing logic to determine whether to merge the EPs of the family of instructions. Alternatively, the EPs could always be merged and the accessed microcode would control whether the family of instructions is issued concurrently.

Further, the selection of a subset of target instructions that may issue concurrently is not required. Microcode routines can be provided for every possible pair of instructions from the target instruction set.

Thus, it is apparent that although the invention has been described with reference to preferred embodiments, substitutions and modification would be obvious to a person of ordinary skill in the art. Accordingly, it is not intended to limit the invention except as provided by the appended claims.

What is claimed is:

1. A method for processing a branch instruction included in a program stored in memory, the method performed by a superscalar processor including a fetch stage for fetching of a plurality of sequential instructions from said program, a branch prediction mechanism for predicting whether a conditional branch instruction in a fetched plurality of instructions is taken and directing fetching along a predicted path, a decode stage for parallel decoding of a plurality of instructions, an execution stage for parallel execution of a plurality of instructions, and a retirement stage for writing result data for said plurality of instructions into logical registers of the processor, said method comprising the steps of:

fetching a continuous flow of sequential instructions, in program order, included in the program stored in memory, with said plurality including a conditional branch instruction and at least one non-branching instruction following said conditional branch instruction, with a value of a branch condition determining whether a conditional branch is taken or not taken;

predicting, prior to decoding, a predicted value of said branch condition;

beginning decoding said plurality of instructions in parallel in a single clock cycle to generate microcode, with said microcode specifying logical destination locations for result data and including control information for executing said non-branching instruction and said conditional branch instruction;

utilizing said microcode for executing said non-branching and conditional branch instructions in parallel in a single clock;

comparing a value of an actual branch condition to said predicted branch condition, and, if said values are not the same:

preventing retirement of result data resulting from the execution of said non-branching instruction following said conditional branch instruction; and redirecting fetching of instructions following said conditional branch instruction along a correct path.

* * * * *